(12) United States Patent
Ren et al.

(10) Patent No.: US 12,439,348 B2
(45) Date of Patent: Oct. 7, 2025

(54) RECEIVER AUTOMATIC GAIN CONTROL

(71) Applicant: QUALCOMM Incorporated, San Diego, CA (US)

(72) Inventors: Yuwei Ren, Beijing (CN); Chao Wei, Beijing (CN); Min Huang, Beijing (CN); Yu Zhang, Beijing (CN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 336 days.

(21) Appl. No.: 17/433,759

(22) PCT Filed: Mar. 12, 2020

(86) PCT No.: PCT/CN2020/078906
§ 371 (c)(1),
(2) Date: Aug. 25, 2021

(87) PCT Pub. No.: WO2020/187116
PCT Pub. Date: Sep. 24, 2020

(65) Prior Publication Data
US 2022/0141779 A1 May 5, 2022

(30) Foreign Application Priority Data

Mar. 19, 2019 (WO) ................ PCT/CN2019/078620

(51) Int. Cl.
*H04W 52/52* (2009.01)
*H04B 1/18* (2006.01)
(52) U.S. Cl.
CPC .............. *H04W 52/52* (2013.01); *H04B 1/18* (2013.01)
(58) Field of Classification Search
CPC . H04W 52/52; H04W 52/241; H04W 52/245; H04B 1/18; H04L 1/08
See application file for complete search history.

(56) References Cited

U.S. PATENT DOCUMENTS

2007/0076827 A1   4/2007   Beamish et al.
2013/0017793 A1   1/2013   Henttonen et al.
(Continued)

FOREIGN PATENT DOCUMENTS

CN   108809603 A   11/2018
CN   109479042 A    3/2019
(Continued)

OTHER PUBLICATIONS

Guangdong Oppo Mobile Telecom: "Discussion of the UE Support of Multiple Numerologies", R1-1611697, 3GPP TSG RAN WG1 Meeting #87, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 14, 2016-Nov. 18, 2016, Nov. 13, 2016, XP051175667, 3 Pages. Section 3, p. 2.
(Continued)

*Primary Examiner* — Yuwen Pan
*Assistant Examiner* — Fatuma G Sherif
(74) *Attorney, Agent, or Firm* — Harrity & Harrity, LLP

(57) ABSTRACT

Various aspects of the present disclosure generally relate to wireless communication. In some aspects, a user equipment may determine an automatic gain control parameter, for a group of downlink symbols associated with a base station, based at least in part on an automatic gain control resource included in the group of downlink symbols. The user equipment may perform, based at least in part on the automatic gain control parameter, automatic gain control for one or more data symbols included in the group of downlink symbols. Numerous other aspects are provided.

30 Claims, 19 Drawing Sheets

(56) References Cited

U.S. PATENT DOCUMENTS

| | | | | |
|---|---|---|---|---|
| 2014/0198688 | A1* | 7/2014 | Li | H04B 1/525 370/278 |
| 2015/0071114 | A1 | 3/2015 | Gulati et al. | |
| 2016/0007269 | A1* | 1/2016 | Chae | H04L 5/0082 370/330 |
| 2016/0308564 | A1* | 10/2016 | Alriksson | H03G 3/3078 |
| 2017/0279581 | A1* | 9/2017 | Park | H04W 52/52 |
| 2018/0309557 | A1 | 10/2018 | Jiang et al. | |
| 2018/0367290 | A1 | 12/2018 | Jin | |
| 2019/0261444 | A1* | 8/2019 | Axmon | H04W 76/28 |
| 2020/0275458 | A1* | 8/2020 | Khoryaev | H04W 72/02 |
| 2021/0036834 | A1* | 2/2021 | Lee | H04L 5/0094 |
| 2021/0352597 | A1* | 11/2021 | Do | H04W 52/52 |

FOREIGN PATENT DOCUMENTS

| | | | | |
|---|---|---|---|---|
| WO | WO-2012095683 | A1 * | 7/2012 | H04B 1/525 |
| WO | 2015038249 | A1 | 3/2015 | |
| WO | 2018175528 | A1 | 9/2018 | |

OTHER PUBLICATIONS

Intel Corporation: "Remaining Details of D2D Physical Channel Design", 3GPP TSG RAN WG1 Meeting #77, 3GPP Draft, R1-142031_INTEL_D2D_PHY, 3rd Generation Partnership Project (3GPP), Mobile Competence Centre, 650, Route Des Lucioles, F-06921 Sophia-Antipolis Cedex, France, vol. RAN WG1, No. Seoul, Korea, May 19, 2014-May 23, 2014, May 10, 2014 (May 10, 2014), XP050814540, 11 Pages, May 9, 2014.

Supplementary European Search Report—EP20772855—Search Authority—The Hague—Nov. 7, 2022.

Ericsson: "Link Level Evaluations of NR PSSCH", R1-1813644, 3GPP TSG-RAN WG1 Meeting #95, Spokane, WA, US, Nov. 12-16, 2018, Nov. 16, 2018, 8 Pages.

International Search Report and Written Opinion—PCT/CN2019/078620—ISA/EPO—Dec. 25, 2019.

International Search Report and Written Opinion—PCT/CN2020/078906—ISA/EPO—May 28, 2020.

Samsung: "Discussion on AGC Settling Issue for NR Sidelink", R1-1808779, 3GPP TSG RAN WG1 Meeting #94, Gothenburg, Sweden, Aug. 20-24, 2018, Aug. 24, 2018, 4 Pages.

* cited by examiner

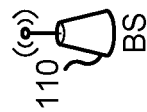
500
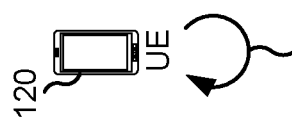
504 – Determine an automatic gain control parameter for the group of downlink symbols
506 – Perform automatic gain control, for one or more data symbols included in the group of downlink symbols, based at least in part on the automatic gain control parameter
FIG. 5D

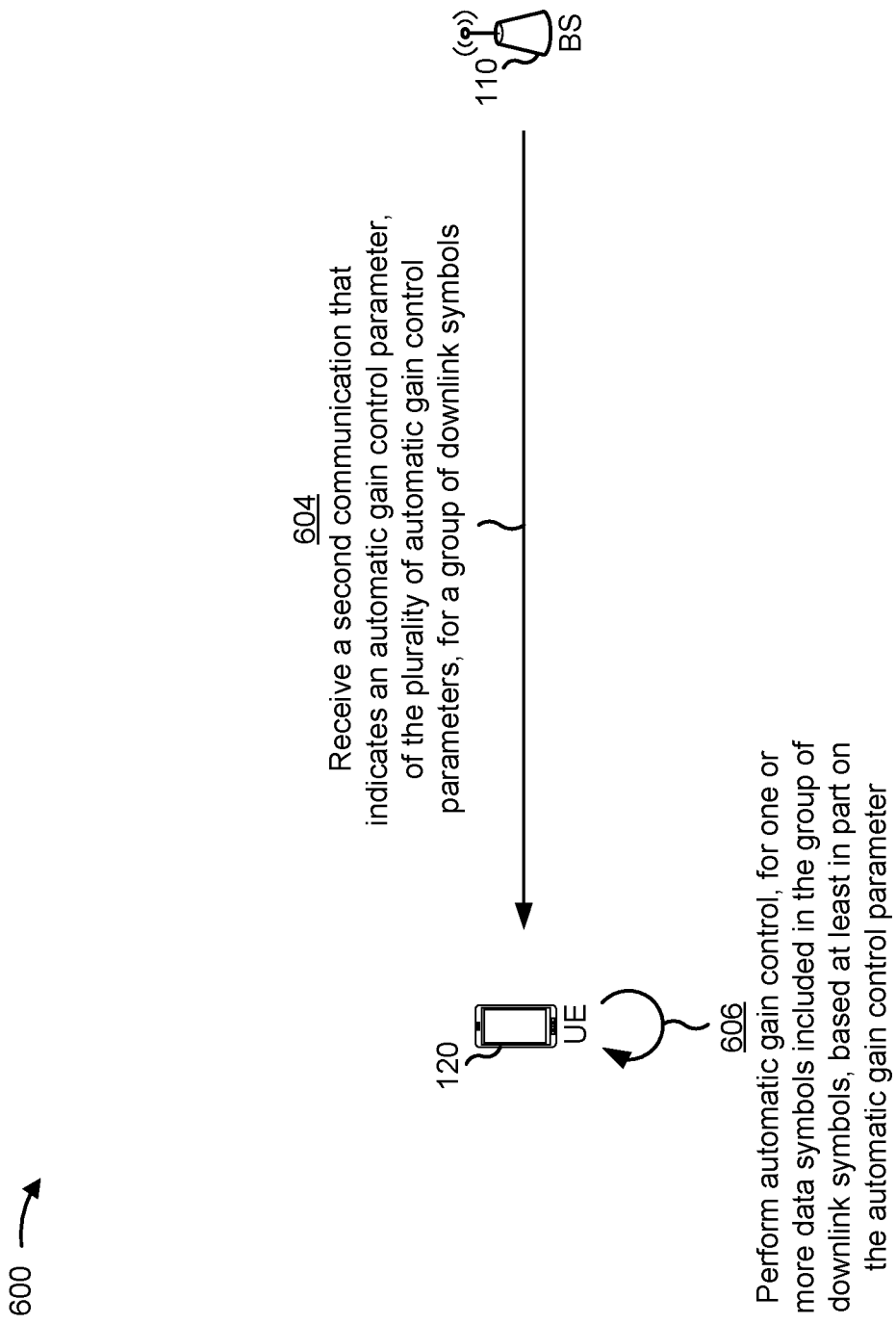

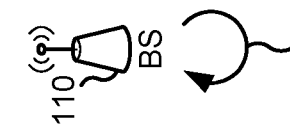
704 – Determine an automatic gain control parameter for the group of uplink symbols
706 – Perform automatic gain control, for one or more data symbols included in the group of uplink symbols, based at least in part on the automatic gain control parameter
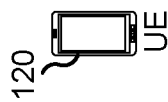
FIG. 7D

RECEIVER AUTOMATIC GAIN CONTROL

CROSS-REFERENCE TO RELATED APPLICATIONS

This application is a 371 national stage of PCT Application No. PCT/CN2020/078906 filed on Mar. 12, 2020, entitled "RECEIVER AUTOMATIC GAIN CONTROL," which claims priority to International Patent Application No. PCT/CN2019/078620, filed on Mar. 19, 2019, entitled "RECEIVER AUTOMATIC GAIN CONTROL," which are hereby expressly incorporated by reference herein.

FIELD OF THE DISCLOSURE

Aspects of the present disclosure generally relate to wireless communication, and to techniques and apparatuses for receiver automatic gain control.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment, may include determining an automatic gain control parameter, for a group of downlink symbols associated with a base station, based at least in part on an automatic gain control resource included in the group of downlink symbols; and performing, based at least in part on the automatic gain control parameter, automatic gain control for one or more data symbols included in the group of downlink symbols.

In some aspects, a user equipment for wireless communication may include memory and one or more processors operatively coupled to the memory. The memory and the one or more processors may be configured to determine an automatic gain control parameter, for a group of downlink symbols associated with a base station, based at least in part on an automatic gain control resource included in the group of downlink symbols; and perform, based at least in part on the automatic gain control parameter, automatic gain control for one or more data symbols included in the group of downlink symbols.

In some aspects, a non-transitory computer-readable medium may store one or more instructions for wireless communication. The one or more instructions, when executed by one or more processors of a user equipment, may cause the one or more processors to determine an automatic gain control parameter, for a group of downlink symbols associated with a base station, based at least in part on an automatic gain control resource included in the group of downlink symbols; and perform, based at least in part on the automatic gain control parameter, automatic gain control for one or more data symbols included in the group of downlink symbols.

In some aspects, an apparatus for wireless communication may include means for determining an automatic gain control parameter, for a group of downlink symbols associated with a base station, based at least in part on an automatic gain control resource included in the group of downlink symbols; and means for performing, based at least in part on the automatic gain control parameter, automatic gain control for one or more data symbols included in the group of downlink symbols.

In some aspects, a method of wireless communication, performed by a user equipment, may include receiving a first communication that indicates a plurality of automatic gain control parameters; receiving a second communication that indicates an automatic gain control parameter, of the plurality of automatic gain control parameters, for a group of downlink symbols; and performing, based at least in part on the automatic gain control parameter, automatic gain control for one or more data symbols included in the group of downlink symbols.

In some aspects, a user equipment for wireless communication may include memory and one or more processors operatively coupled to the memory. The memory and the one or more processors may be configured to receive a first communication that indicates a plurality of automatic gain control parameters; receive a second communication that indicates an automatic gain control parameter, of the plurality of automatic gain control parameters, for a group of downlink symbols; and perform, based at least in part on the automatic gain control parameter, automatic gain control for one or more data symbols included in the group of downlink symbols.

In some aspects, a non-transitory computer-readable medium may store one or more instructions for wireless communication. The one or more instructions, when executed by one or more processors of a user equipment, may cause the one or more processors to receive a first communication that indicates a plurality of automatic gain control parameters; receive a second communication that indicates an automatic gain control parameter, of the plurality of automatic gain control parameters, for a group of downlink symbols; and perform, based at least in part on the automatic gain control parameter, automatic gain control for one or more data symbols included in the group of downlink symbols.

In some aspects, an apparatus for wireless communication may include means for receiving a first communication that indicates a plurality of automatic gain control parameters; means for receiving a second communication that indicates an automatic gain control parameter, of the plurality of automatic gain control parameters, for a group of downlink symbols; and means for performing, based at least in part on the automatic gain control parameter, automatic gain control for one or more data symbols included in the group of downlink symbols.

In some aspects, a method of wireless communication, performed by a base station, may include transmitting, to a user equipment, a first communication that indicates a plurality of automatic gain control parameters; and transmitting, to the user equipment, a second communication that indicates an automatic gain control parameter, of the plurality of automatic gain control parameters, for a group of downlink symbols associated with the base station.

In some aspects, a base station for wireless communication may include memory and one or more processors operatively coupled to the memory. The memory and the one or more processors may be configured to determine an automatic gain control parameter, for a group of uplink symbols associated with a user equipment, based at least in part on an automatic gain control resource included in the group of uplink symbols; and perform, based at least in part on the automatic gain control parameter, automatic gain control for one or more data symbols included in the group of uplink symbols.

In some aspects, a non-transitory computer-readable medium may store one or more instructions for wireless communication. The one or more instructions, when executed by one or more processors of a base station, may cause the one or more processors to determine an automatic gain control parameter, for a group of uplink symbols associated with a user equipment, based at least in part on an automatic gain control resource included in the group of uplink symbols; and perform, based at least in part on the automatic gain control parameter, automatic gain control for one or more data symbols included in the group of uplink symbols.

In some aspects, an apparatus for wireless communication may include means for determining an automatic gain control parameter, for a group of uplink symbols associated with a user equipment, based at least in part on an automatic gain control resource included in the group of uplink symbols; and means for performing, based at least in part on the automatic gain control parameter, automatic gain control for one or more data symbols included in the group of uplink symbols.

In some aspects, a method of wireless communication, performed by a base station, may include determining an automatic gain control parameter, for a group of uplink symbols associated with a user equipment, based at least in part on an automatic gain control resource included in the group of uplink symbols; and performing, based at least in part on the automatic gain control parameter, automatic gain control for one or more data symbols included in the group of uplink symbols.

In some aspects, a base station for wireless communication may include memory and one or more processors operatively coupled to the memory. The memory and the one or more processors may be configured to transmit, to a user equipment, a first communication that indicates a plurality of automatic gain control parameters; and transmit, to the user equipment, a second communication that indicates an automatic gain control parameter, of the plurality of automatic gain control parameters, for a group of downlink symbols associated with the base station.

In some aspects, a non-transitory computer-readable medium may store one or more instructions for wireless communication. The one or more instructions, when executed by one or more processors of a base station, may cause the one or more processors to transmit, to a user equipment, a first communication that indicates a plurality of automatic gain control parameters; and transmit, to the user equipment, a second communication that indicates an automatic gain control parameter, of the plurality of automatic gain control parameters, for a group of downlink symbols associated with the base station.

In some aspects, an apparatus for wireless communication may include means for transmitting, to a user equipment, a first communication that indicates a plurality of automatic gain control parameters; and means for transmitting, to the user equipment, a second communication that indicates an automatic gain control parameter, of the plurality of automatic gain control parameters, for a group of downlink symbols associated with the apparatus.

Aspects generally include a method, apparatus, system, computer program product, non-transitory computer-readable medium, user equipment, base station, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 5A-5D, 6A and 6B, and 7A-7D are diagrams illustrating examples of receiver automatic gain control, in accordance with various aspects of the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
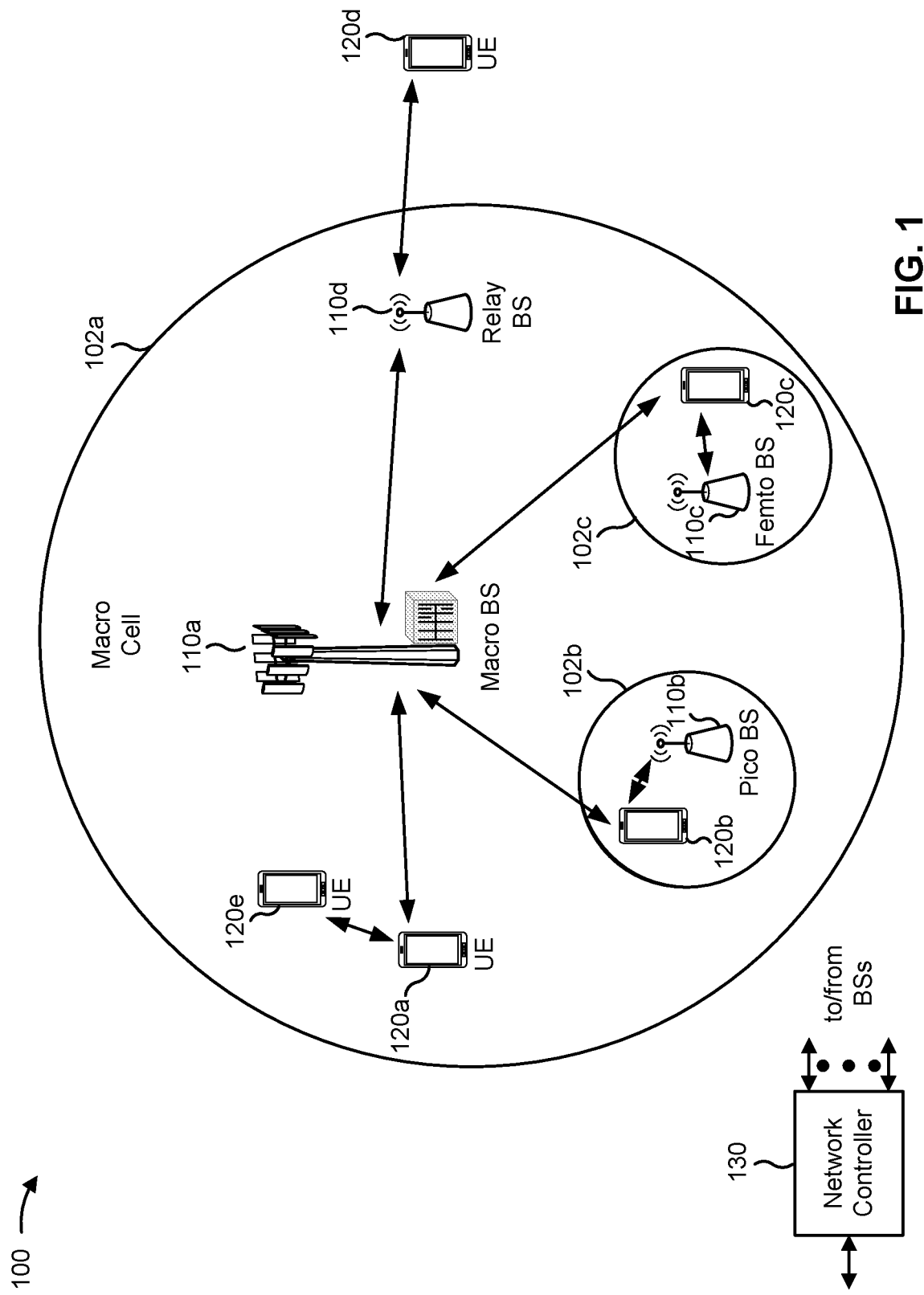
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. ABS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. ABS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
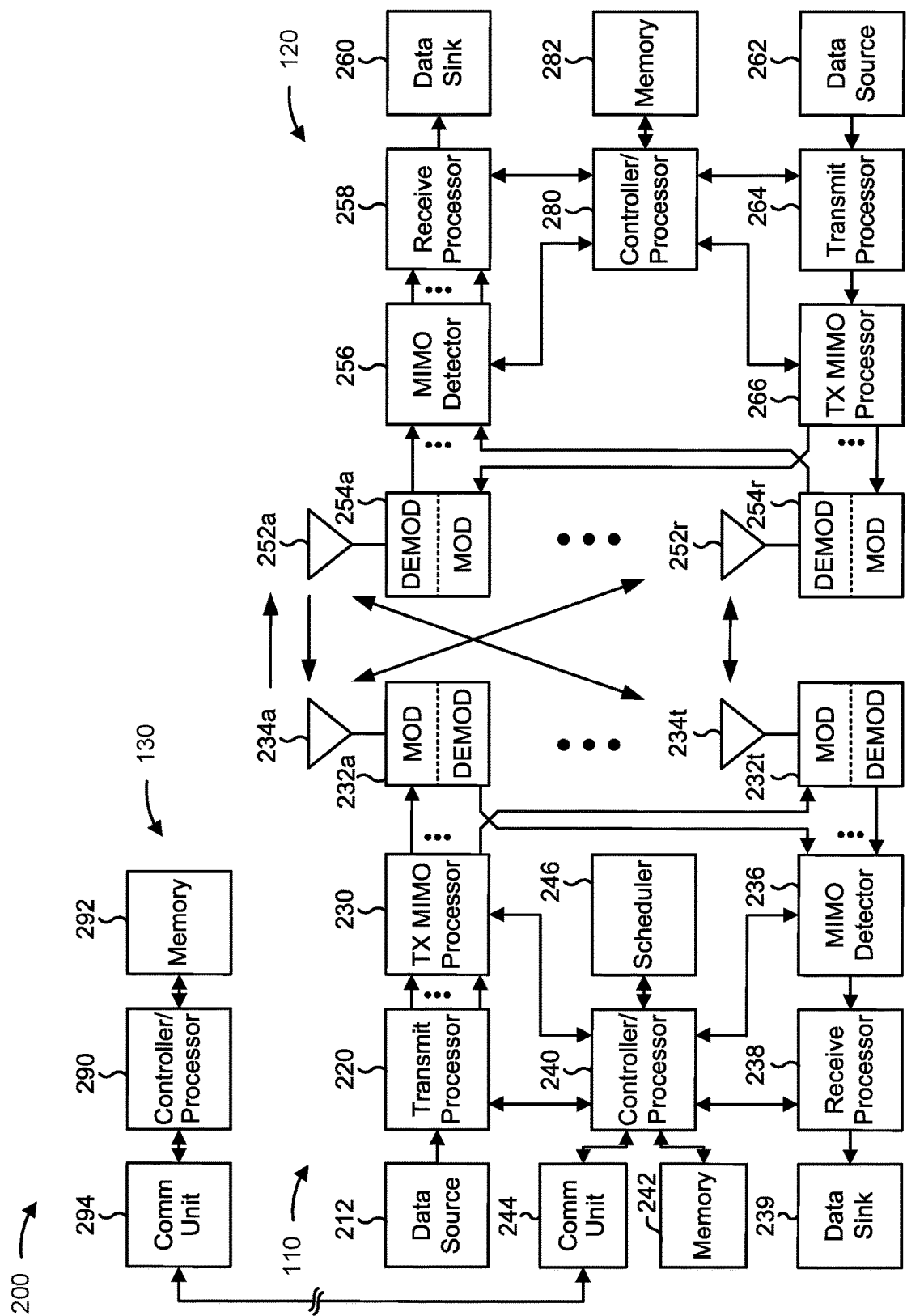
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with receiver automatic gain control, as described in more detail elsewhere herein. For example, controller/processor 240 of base station 110, controller/processor 280 of UE 120, and/or any other component(s) of FIG. 2 may perform or direct operations of, for example, process 800 of FIG. 8, process 900 of FIG. 9, process 1000 of FIG. 10, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for determining an automatic gain control parameter, for a group of downlink symbols associated with a base station, based at least in part on an automatic gain control resource included in the group of downlink symbols, means for performing, based at least in part on the automatic gain control parameter, automatic gain control for one or more data symbols included in the group of downlink symbols, and/or the like. In some aspects, UE 120 may include means for receiving a first communication that indicates a plurality of automatic gain control parameters, means for receiving a second communication that indicates an automatic gain control parameter, of the plurality of automatic gain control parameters, for a group of downlink symbols, means for performing, based at least in part on the automatic gain control parameter, automatic gain control for one or more data symbols included in the group of downlink symbols, and/or the like. In some aspects, such means may include one or more components of UE 120 described in connection with FIG. 2.

In some aspects, base station 110 may include means for determining an automatic gain control parameter, for a group of uplink symbols associated with a user equipment, based at least in part on an automatic gain control resource included in the group of uplink symbols, means for performing, based at least in part on the automatic gain control parameter, automatic gain control for one or more data symbols included in the group of uplink symbols, and/or the like. In some aspects, base station 110 may include means for transmitting, to a user equipment, a first communication that indicates a plurality of automatic gain control parameters, means for transmitting, to the user equipment, a second communication that indicates an automatic gain control parameter, of the plurality of automatic gain control parameters, for a group of downlink symbols associated with the base station, and/or the like. In some aspects, such means may include one or more components of base station 110 described in connection with FIG. 2.

As indicated above, FIG. 2 is provided as an example. Other examples may differ from what is described with regard to FIG. 2.

Figure 3A:
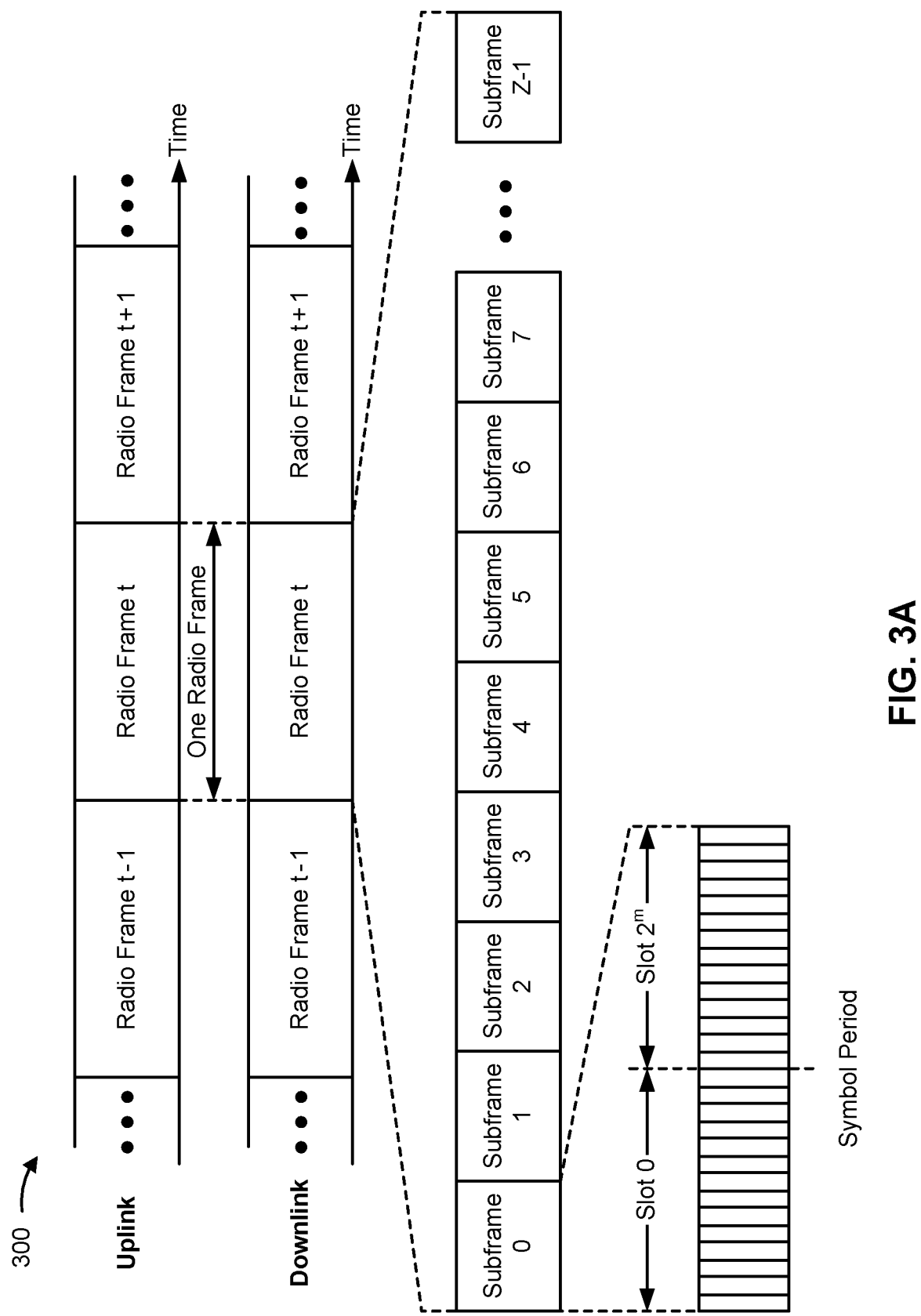
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
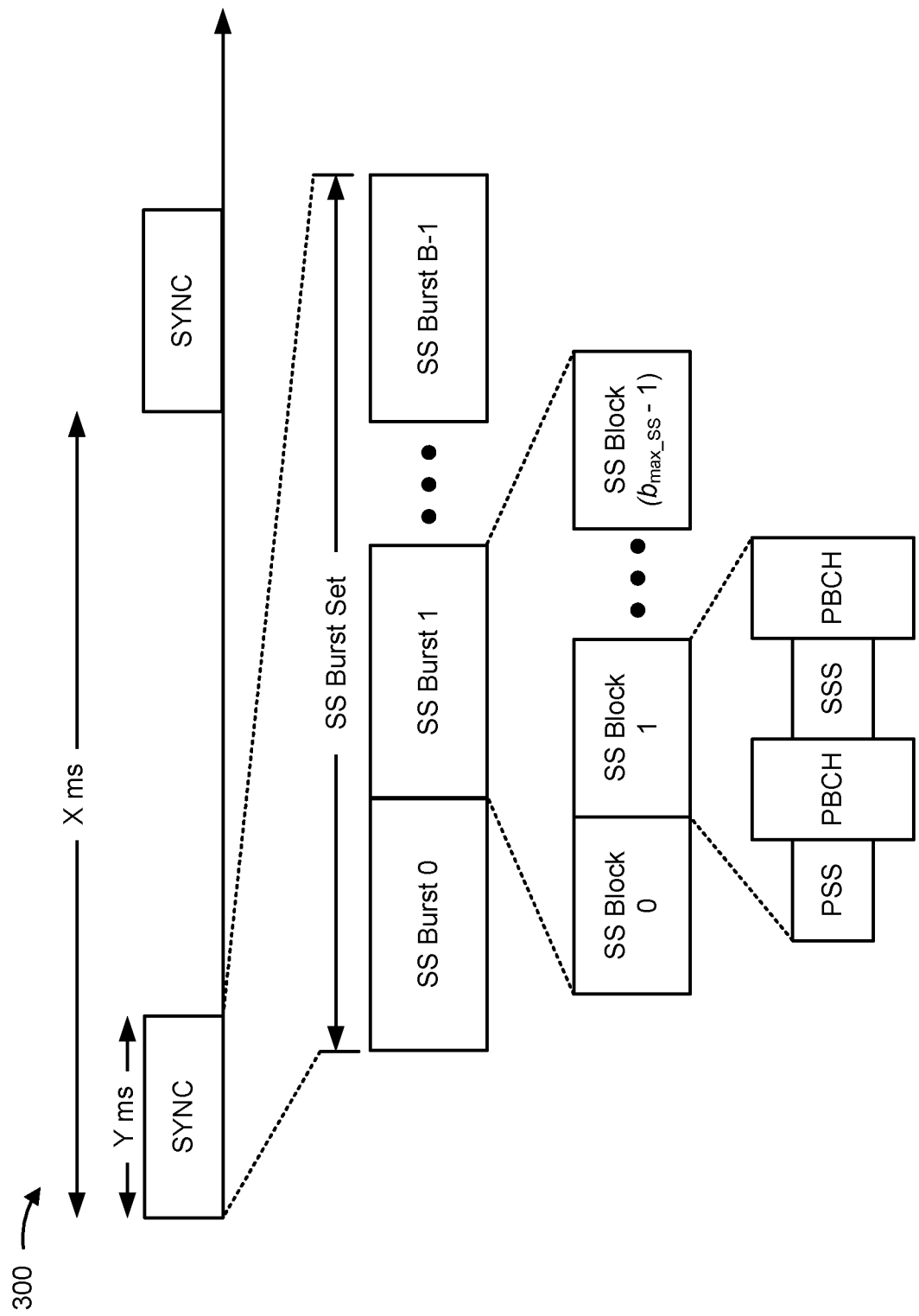
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
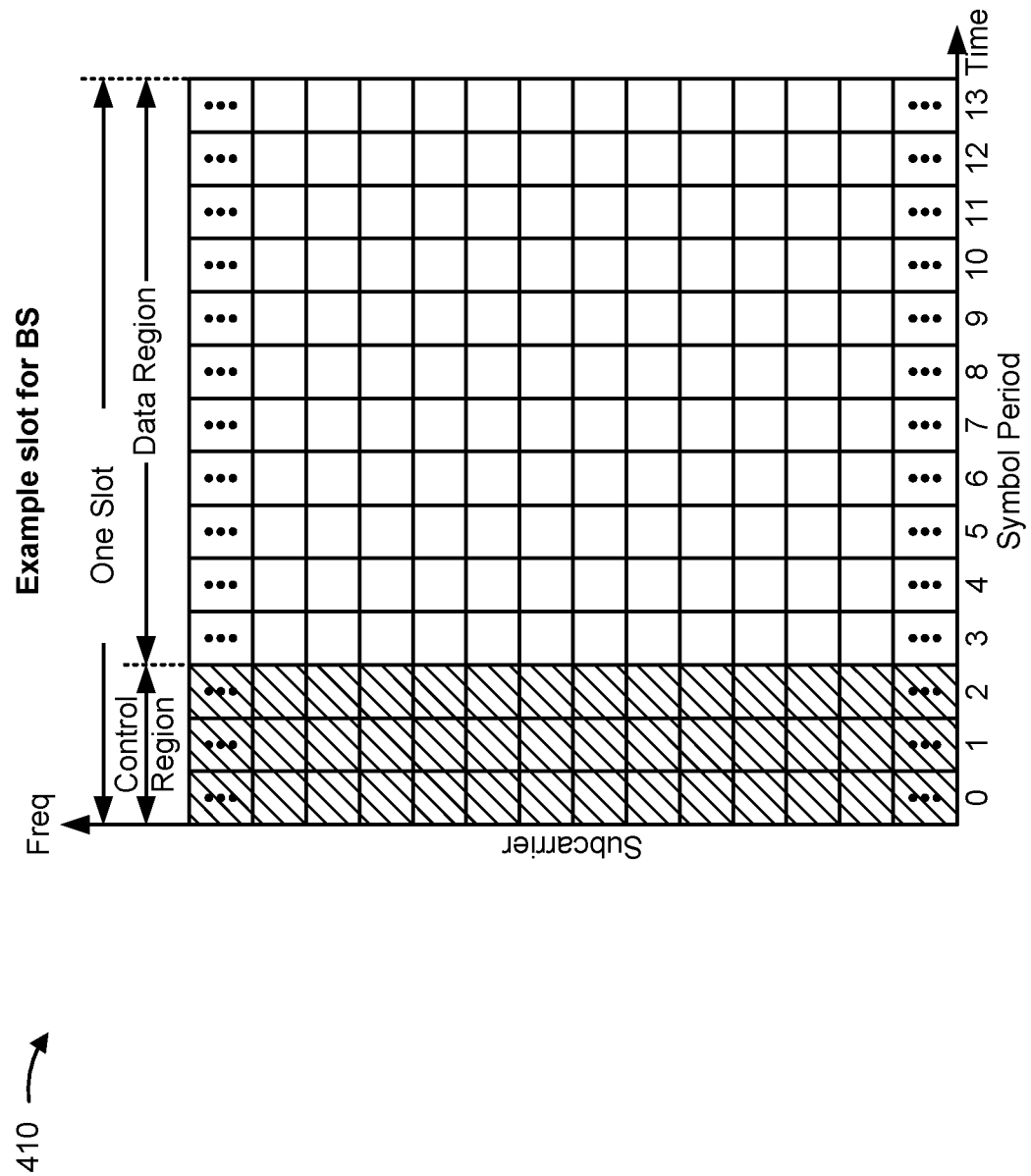
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SNIR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHz may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such as central units or distributed units.

As indicated above, FIG. 4 is provided as an example. Other examples may differ from what is described with regard to FIG. 4.

In a wireless network, a UE and a BS may communicate using various communication modes. For example, the UE and the BS may communicate using a full-duplex modes, such as where the UE and the BS simultaneously communicate on a downlink and an uplink, where the UE simultaneously communicates with the BS and another BS, where the BS simultaneously communicates with the UE and another UE, and/or the like. As another example, the UE and the BS may communicate using a non-full-duplex modes, such as where the UE and the BS perform half-duplex communication and/or another type of non-full-duplex communication.

When a receiver (e.g., the UE or the BS) receives a communication from a transmitter (e.g., the UE or the BS), the receiver may perform automatic gain control (AGC) for the reception of the communication. For example, the receiver may regulate a received signal strength of the communication by performing outer loop AGC on the transmission of the communication after a radio frequency (RF) chain of the receiver and prior to the transmission of the communication being provided to an analog-to-digital converter for analog-to-digital conversion. The outer loop AGC may include a closed feedback loop that measures a signal strength of the transmission of the communication after analog-to-digital conversion, and modifies the RF gain parameter based at least in part on the measurement. If the signal strength of the transmission of the communication is weak, the outer loop AGC may modify the RF gain parameter to boost one or more receiver gain stages in the RF chain to reduce noise and improve the signal-to-noise ratio (SNR) of the transmission of the communication. If the signal strength of the transmission of the communication is strong, the outer loop AGC may modify the RF gain parameter to attenuate the one or more receiver gain stages in the RF chain to reduce signal clipping and/or nonlinear degradations of the transmission of the communication.

In some cases, the receiver may experience large and/or fast variations in receive signal strength when the transmitter switches between full-duplex communication and non-full-duplex communication. For example, if the UE is the receiver, the UE may experience a large and/or fast decrease in received signal strength from the BS, when the BS switches from non-full-duplex mode to full-duplex mode, since the BS may reduce downlink transmit power in order to reduce self-interference at the BS (e.g., interference with receiving uplink transmissions at the BS due to the BS simultaneously transmitting downlink communications). As another example, the UE may experience a large and/or fast increase in received signal strength from the BS as the BS switches from full-duplex mode to non-full-duplex mode and accordingly increases downlink transmit power.

If the receiver is the BS, the self-interference at the BS, when the BS switches from non-full-duplex mode to full-duplex mode, may cause a large and/or fast increase in uplink receive signal strength at the BS (e.g., due to the BS decreasing downlink transmit power during full-duplex mode). When the BS switches from full-duplex mode to non-full-duplex mode, the BS may experience a large and/or fast decrease in receive signal strength as the BS increases downlink transmit power in the non-full-duplex mode.

In some cases, the receiver may reduce the effects of variations in receive signal strength by using configured receive AGC states. For example, if the receiver knows or expects an increase or decrease in receive signal strength (such as known or expected transitions between different types of downlink channels or uplink channels), the receiver may use the configured receive AGC states to perform outer loop AGC to adjust RF gain to the increase or decrease in receive signal strength. However, since transitions between full-duplex mode and non-full-duplex mode may not be known to the receiver, and/or may not be predictable, the use of configured receive AGC states may be impractical for transitions between full-duplex mode and non-full-duplex mode. This may cause a decrease in SNR, an increase in clipping, and/or an increase in nonlinear degradations for communications that are received at the receiver.

Some aspects described herein provide techniques and apparatuses for receive automatic gain control. In some aspects, a transmitter (e.g., a UE or a BS) may be configured to transmit a group of symbols that includes an AGC resource and one or more data symbols. The group of symbols may include full-duplex symbols or non-full-duplex symbols. A receiver (e.g., a UE or a BS) may receive the group of symbols, may determine an AGC parameter (e.g., an RF gain parameter and/or another type of AGC parameter) based at least in part on the AGC resource, and may perform, based at least in part on the AGC parameter, AGC for the one or more data symbols. In some aspects, a transmitter may transmit a first communication that indicates a plurality of AGC parameters. The transmitter may transmit a second communication that indicates an AGC parameter, of the plurality of AGC parameters, for a group of symbols. A receiver may receive the first communication and the second communication, and may perform, based at least in part on the AGC parameter indicated in the second communication, AGC for one or more data symbols included in the group of symbols.

In this way, the receiver is capable of using the AGC parameter to perform outer loop AGC for transitions between full-duplex mode and non-full-duplex mode, which increases SNR, decreases clipping, and/or decreases nonlinear degradations for communications that are received at the receiver.

Figure 5A:
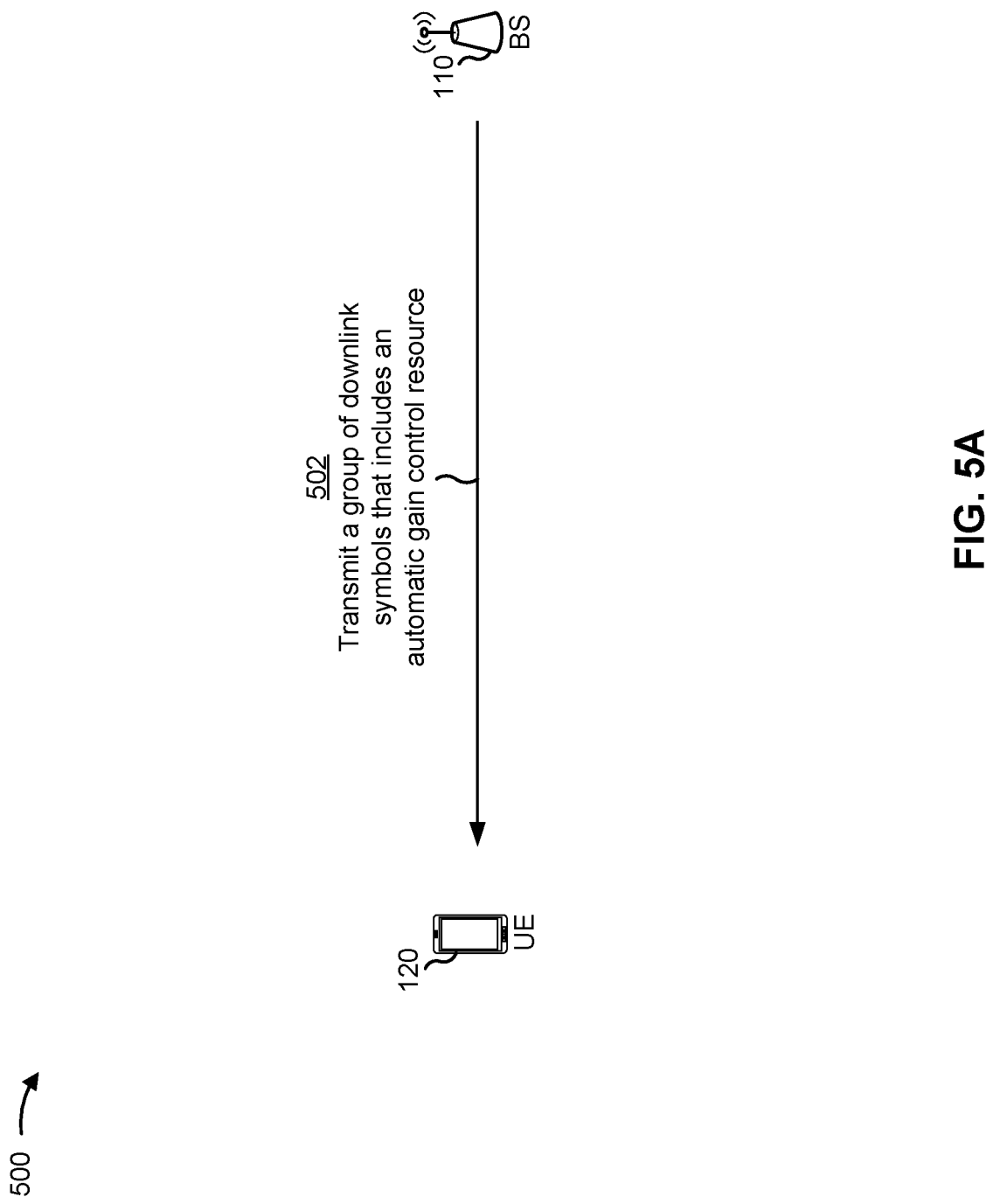

FIGS. 5A-5D are diagrams illustrating an example 500 of receiver automatic gain control, in accordance with various aspects of the present disclosure. As shown in FIG. 5A, example 500 may include a user equipment (e.g., UE 120) and a base station (e.g., BS 110). In some aspects, UE 120 and BS 110 may be communicatively connected and may communicate via a wireless communication link. The wireless communication link may include a downlink and an uplink. In some aspects, UE 120 and BS 110 may communicate using various communication modes, such as a full duplex mode, a non-full-duplex mode, and/or the like.

As shown in FIG. 5A, and by reference number 502, BS 110 may communicate with UE 120 by transmitting a group of downlink symbols to UE 120. The group of downlink symbols may be included in a full-duplex resource or a non-full-duplex resource associated with BS 110. The group of downlink symbols may include an AGC resource and one or more data symbols. The AGC resource may include a reference signal (e.g., an AGC reference signal (AGC-RS) and/or another type of reference signal), a repetitive data transmission of data that is transmitted in the one or more data symbols, and/or the like.

In some aspects, BS 110 may indicate a configuration of the AGC resource to UE 120. The configuration of the AGC resource may be indicated in a signaling communication, such as a radio resource control (RRC) communication, a medium access control (MAC) control element (MAC-CE) communication, a downlink control information (DCI) communication, and/or the like. In some aspects, the configuration of the AGC resource may indicate whether a particular group of downlink symbols includes an AGC resource and/or one or more parameters for the AGC resource in the group of downlink symbols.

In some aspects, BS 110 may include the AGC resource in each group of downlink symbols transmitted from BS 110. In some aspects, BS 110 may include the AGC resource based at least in part on a transition between transition modes (e.g., a transition from a full-duplex mode to a non-full-duplex mode, a transition from a non-full-duplex mode to a full-duplex mode, and/or the like). In this case, BS 110 may include an AGC resource in a full-duplex resource that follows a non-full-duplex resource, may include an AGC resource in a non-full-duplex resource that follows a full-duplex resource, and/or the like. In some aspects, BS 110 may include an AGC resource, in a group of downlink symbols, based at least in part on receiving, from UE 120, an indication of received power saturation at UE 120. The indication of the received power saturation may include a saturation index and/or another type of indication of received power saturation. UE 120 may transmit the indication of the received power saturation on a physical uplink control channel (PUCCH), on a physical uplink shared channel (PUSCH), and/or the like.

The one or more parameters for the AGC resource may include a subcarrier spacing of the AGC resource (e.g., the subcarrier spacing of the AGC resource may be the same or different from the subcarrier spacing of the one or more data symbols), a transmit power of the AGC resource (e.g., the transmit power of the AGC resource may be the same or different from the transmit power of the one or more data symbols), a location of the AGC resource in the group of downlink symbols (e.g., an indication of the symbols that include the AGC resource), a length of the AGC resource (e.g., a quantity of symbols included in the AGC resource), a type of the AGC resource (e.g., whether the AGC resource includes an AGC-RS or a repetitive data transmission), a quasi-co-location (QCL) of the AGC resource (e.g., an indication of whether the AGC resource is QCL'ed with the one or more data symbols), and/or the like.

Figure 5B:
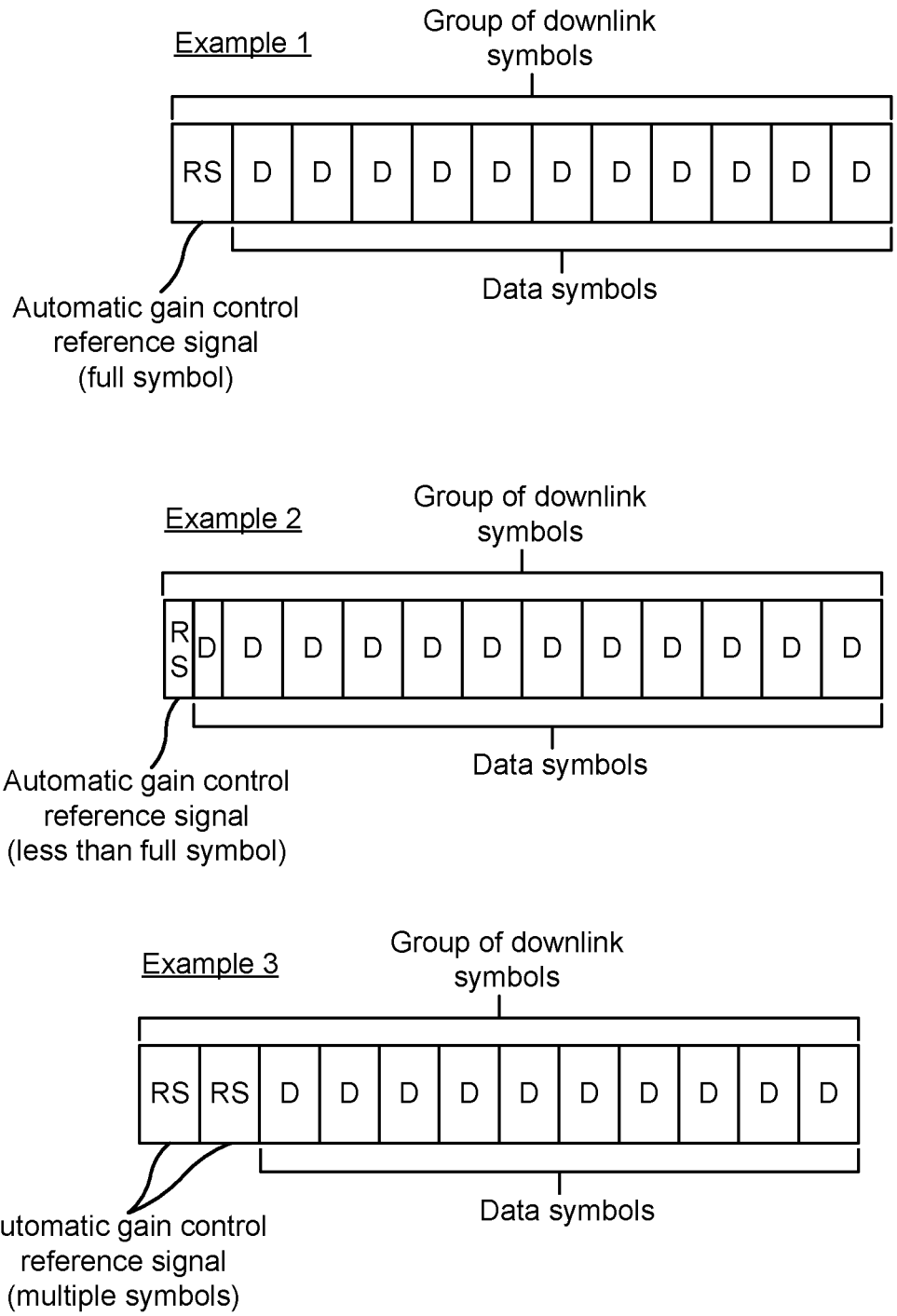

FIG. 5B illustrates various examples of AGC resource configurations where the AGC resource includes an AGC-RS. Other examples of AGC resource configurations for an AGC-RS may be used.

As shown in Example 1 illustrated in FIG. 5B, the AGC resource may include a full AGC symbol in which the AGC-RS is transmitted. The full AGC symbol may be located at the beginning of the group of downlink symbols (e.g., may be the first symbol in the group of downlink symbols), such that UE 120 may use the AGC-RS to perform AGC for the data symbols included in the group of downlink symbols, or another location in the group of downlink symbols.

As shown in Example 2 illustrated in FIG. 5B, the AGC-RS may be transmitted in less than a full AGC symbol in the group of downlink symbols. For example, the AGC-RS may be transmitted in a half AGC symbol, a quarter AGC symbol, and/or other symbol portions. The less than a full AGC symbol may be located at the beginning of the group of downlink symbols or another location in the group of downlink symbols.

As shown in Example 3 illustrated in FIG. 5B, the AGC resource may include a plurality of full AGC symbols in which the AGC-RS is transmitted. The plurality of full AGC symbols may be located at the beginning of the group of downlink symbols (e.g., may be the first symbols in the group of downlink symbols) or another location in the group of downlink symbols. The plurality of full AGC symbols may be continuous symbols or non-contiguous symbols. Other examples of AGC resource configurations include a plurality of less than full AGC symbols in the group of downlink symbols, a combination of full AGC symbols and less than full AGC symbols in the group of downlink symbols, and/or the like.

Figure 5C:
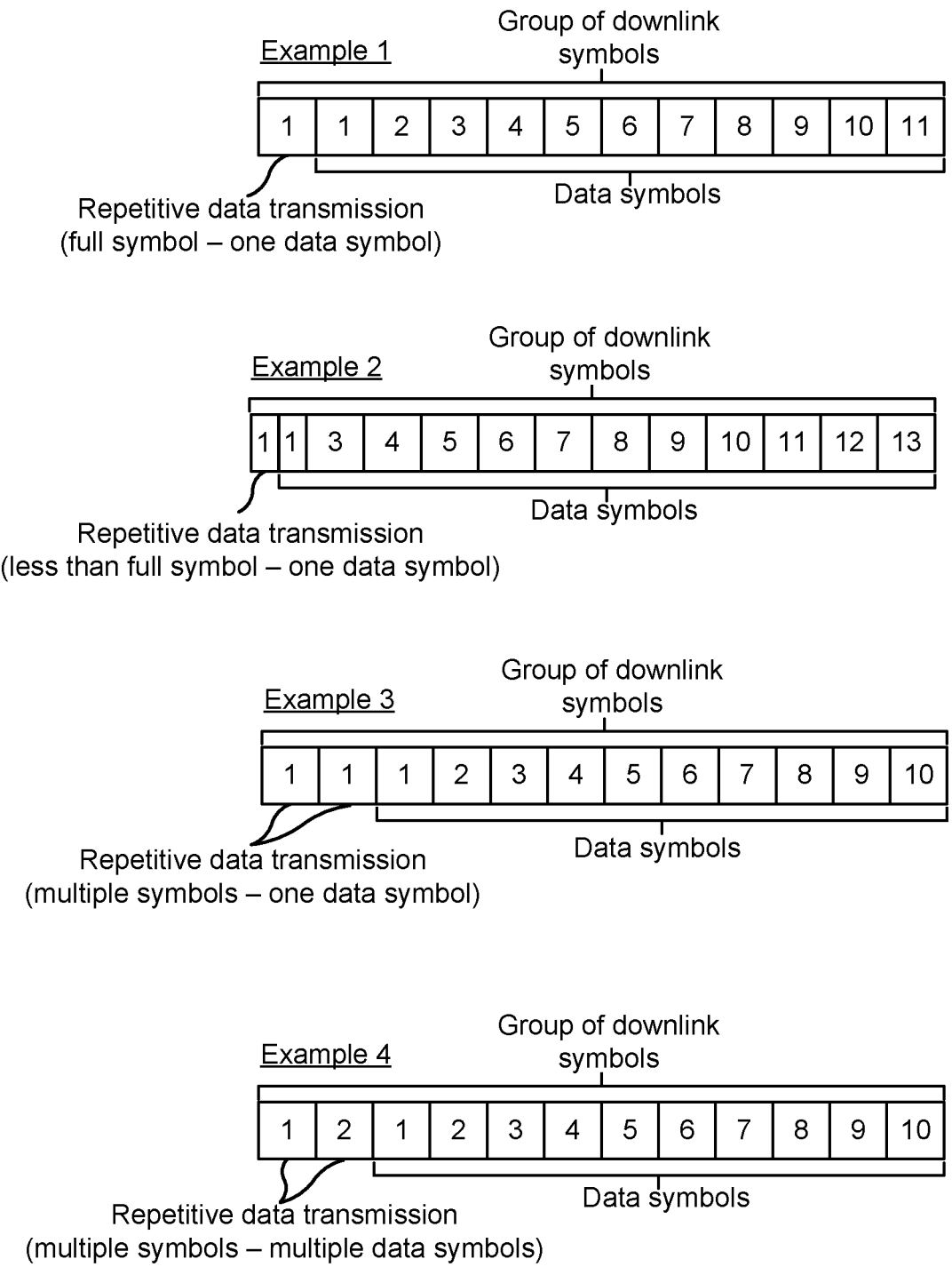

FIG. 5C illustrates various examples of AGC resource configurations where the AGC resource includes a repetitive data transmission of data that is transmitted in the one or more data symbols included in the group of downlink symbols. Other examples of AGC resource configurations for a repetitive data transmission may be used.

As shown in Example 1 illustrated in FIG. 5C, the AGC resource may include a full AGC symbol in which repetitive data for a full data symbol is transmitted. The full AGC symbol may be located at the beginning of the group of downlink symbols (e.g., may be the first symbol in the group of downlink symbols) such that UE 120 may use the repetitive data transmission to perform AGC for the data symbols included in the group of downlink symbols. The full AGC symbol may be adjacent to the data symbol associated with the repetitive data transmission. That is, the data that is to be transmitted in the full AGC symbol may be a repetition of the data that is to be transmitted in the data symbol adjacent to the full AGC symbol. For example, a repetition of the data from data symbol 1 may be transmitted in the full AGC symbol. In other examples, the data that is to be transmitted in the full AGC symbol may be a repetition of data that is to be transmitted in a data symbol that is not adjacent to the full AGC symbol.

As shown in Example 2 illustrated in FIG. 5C, the AGC resource may include a less than full AGC symbol (e.g., a half AGC symbol, a quarter AGC symbol, and/or the like) in which repetitive data for a full data symbol is transmitted. The less than full AGC symbol may be located at the beginning of the group of downlink symbols (e.g., may be the first half-symbol in the group of downlink symbols). The less than full AGC symbol may be adjacent to a full or less than full data symbol associated with the repetitive data transmission. That is, the data that is to be transmitted in the less than full AGC symbol may be a repetition of the data that is to be transmitted in the full or less than full data symbol adjacent to the less than full AGC symbol. For example, a repetition of the data from data symbol 1 (e.g., a half data symbol) may be transmitted in the less than full AGC symbol. In other examples, the data that is to be transmitted in the less than full AGC symbol may be a repetition of data that is to be transmitted in a data symbol that is not adjacent to the less than full AGC symbol.

As shown in Example 3 illustrated in FIG. 5C, the AGC resource may include a plurality of AGC symbols (e.g., full AGC symbols, less than full AGC symbols, and/or the like) in which repetitive data for a data symbol is transmitted (e.g., a full data symbol or a less than full data symbol). The plurality of AGC symbols may be located at the beginning of the group of downlink symbols (e.g., may be the first symbols in the group of downlink symbols) or another location in the group of downlink symbols. The plurality of full AGC symbols may be contiguous symbols or non-contiguous symbols. The plurality of AGC symbols may be adjacent to the data symbol associated with the repetitive data transmission. That is, the data that is to be transmitted in the plurality of AGC symbols may be a repetition of the data that is to be transmitted in the data symbol adjacent to the plurality of AGC symbols. For example, repetitions of the data from data symbol 1 may be transmitted in the plurality of AGC symbols. In other examples, the data that is to be transmitted in the plurality of AGC symbols may be a repetition of data that is to be transmitted in a data symbol that is not adjacent to the plurality of AGC symbols.

As shown in Example 4 illustrated in FIG. 5C, the AGC resource may include a plurality of AGC symbols (e.g., full AGC symbols, less than full AGC symbols, and/or the like) in which repetitive data for a plurality of data symbols is transmitted (e.g., full data symbols, less than full data symbols, and/or the like). The plurality of AGC symbols may be located at the beginning of the group of downlink symbols (e.g., may be the first symbols in the group of downlink symbols) or another location in the group of downlink symbols. The plurality of full AGC symbols may be continuous symbols or non-contiguous symbols. In some aspects, the plurality of AGC symbols may be adjacent to the plurality of data symbols associated with the repetitive data transmission. In some aspects, the plurality of AGC symbols may not be adjacent to the plurality of data symbols associated with the repetitive data transmission. In some aspects, one or more AGC symbols of the plurality of AGC symbols may be adjacent to the plurality of data symbols associated with the repetitive data transmission, and one or more other AGC symbols of the plurality of AGC symbols may not be adjacent to the plurality of data symbols associated with the repetitive data transmission. In an example, repetitions of the data from data symbol 1 and data symbol 2 may be respectively transmitted in AGC symbols of the plurality of AGC symbols.

As shown in FIG. 5D, UE 120 may perform outer loop AGC based at least in part on the AGC resource included in the group of downlink symbols. As shown by reference number 504, to perform outer loop AGC for the one or more data symbols included in the group of downlink symbols, UE 120 may determine an AGC gain parameter for the group of downlink symbols. UE 120 may determine the AGC gain parameter by performing one or more signal measurements of the AGC-RS or repetitive data transmission of the AGC resource. The one or more signal measurements may include a reference signal received power (RSRP) measurement, a received signal strength indicator (RSSI) measurement, a reference signal received quality (RSRQ) measurement, and/or the like. UE 120 may determine the AGC parameter (e.g., an RF gain parameter and/or another type of AGC parameter), for the one or more data symbols that are included in the group of downlink symbols, based at least in part on a result of the one or more signal measurements.

As further shown in FIG. 5D, and by reference number 506, UE 120 may perform, based at least in part on the AGC parameter, AGC for the one or more data symbols included in the group of data symbols. For example, UE 120 may use the RF gain parameter and/or another type of AGC parameter to perform outer loop AGC to adjust an RF gain to increase or decrease a received signal strength of the one or more data symbols. Accordingly, if the receive signal strength of the one or more data symbols is too weak, UE 120 may use the RF gain parameter to boost one or more receiver gain stages, in an RF chain of UE 120, to reduce noise and improve the SNR of the transmission of the one or more data symbols. Moreover, if the receive signal strength of the transmission of the one or more data symbols is too strong, UE 120 may use the RF gain parameter to attenuate the one or more receiver gain stages in the RF chain to reduce signal clipping and/or nonlinear degradations of the transmission of the one or more data symbols.

In this way, UE 120 is capable of using the AGC parameter to perform outer loop AGC for transitions between full-duplex mode and non-full-duplex mode, which increases SNR, decreases clipping, and/or decreases nonlinear degradations for communications that are received at UE 120.

As indicated above, FIGS. 5A-5D are provided as an example. Other examples may differ from what is described with respect to FIGS. 5A-5D.

Figure 6A:
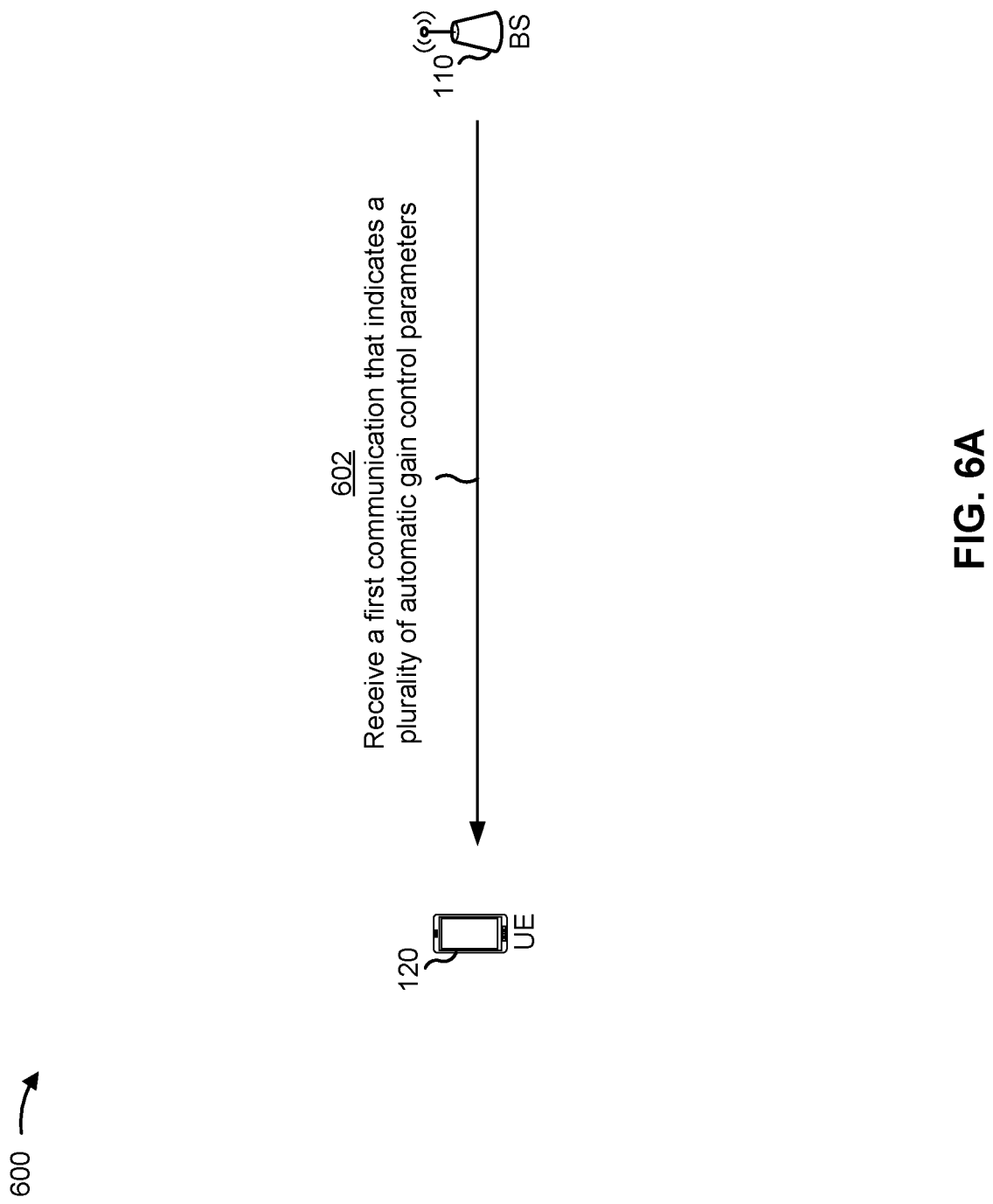

FIGS. 6A and 6B are diagrams illustrating an example 600 of receiver automatic gain control, in accordance with various aspects of the present disclosure. As shown in FIG. 6A, example 600 may include a user equipment (e.g., UE 120) and a base station (e.g., BS 110). In some aspects, UE 120 and BS 110 may be communicatively connected and may communicate via a wireless communication link. The wireless communication link may include a downlink and an uplink. In some aspects, UE 120 and BS 110 may communicate using various communication modes, such as a full duplex mode, a non-full-duplex mode, and/or the like.

As shown in FIG. 6A, and by reference number 602, BS 110 may configure UE 120 with a plurality of AGC parameters by transmitting, to UE 120, a first communication that indicates the plurality of AGC parameters. In some aspects, BS 110 may transmit the first communication based at least in part on UE 120 communicatively connecting with BS 110, may transmit the first communication to UE 120 by broadcasting and/or multicasting the first communication to UE 120 and/or one or more other UEs, and/or the like. In some aspects, the first communication may include a broadcast communication (e.g., transmitted on a physical broadcast channel (PBCH)), such as a master information block (MIB), a system information block (SIB), a remaining minimum system information (RMSI) communication, an other system information (OSI) communication, and/or the like. In some aspects, the first communication may include a signaling communication (e.g., transmitted on a physical downlink control channel (PDCCH)), such as an RRC communication, a MAC-CE communication, a DCI communication, and/or the like.

In some aspects, the plurality of AGC parameters may include a plurality of downlink power ratios and/or another type of AGC parameter. In some aspects, a downlink power ratio may include a ratio between downlink power for full-duplex communication and a downlink power for non-full-duplex communication. In some aspects, a downlink power ratio may include a ratio between downlink power for a non-full-duplex communication and a downlink power for a full-duplex communication. BS 110 may configure UE 120 with the plurality of downlink power ratios so that BS 110 can instruct UE 120 to use a particular downlink power ratio, of the plurality of downlink power ratios, for AGC for a particular group (or groups) of downlink symbols. In some aspects, UE 120 may use a downlink power ratio to determine an RF gain parameter, for full-duplex communication, from an RF gain parameter for non-full-duplex communication. In some aspects, UE 120 may use a downlink power ratio to determine an RF gain parameter, for non-full-duplex communication, from an RF gain parameter for full-duplex communication.

As shown in FIG. 6B, and by reference number 604, BS 110 may transmit, to UE 120, a second communication that indicates an AGC parameter, of the plurality of AGC parameters, for a group (or for a plurality of groups) of downlink symbols. The second communication may include a signaling communication (e.g., transmitted on a PDCCH), such as an RRC communication, a MAC-CE communication, a DCI communication, and/or the like. In some aspects, BS 110 may transmit the second communication in another group of downlink symbols preceding the group of downlink symbols (e.g., adjacent to the group of downlink symbols or not adjacent to the group of downlink symbols) for which UE 120 is to use the AGC parameter to perform AGC.

In some aspects, BS 110 may indicate an AGC parameter for each group of downlink symbols transmitted from BS 110. In some aspects, BS 110 may indicate an AGC parameter based at least in part on a transition between transition modes (e.g., a transition from a full-duplex mode to a non-full-duplex mode, a transition from a non-full-duplex mode to a full-duplex mode, and/or the like). In this case, BS 110 may indicate an AGC parameter based at least in part on a transition to a full-duplex resource that follows a non-full-duplex resource, may indicate an AGC parameter based at least in part on a transition to a non-full-duplex resource that follows a full-duplex resource, and/or the like. In some aspects, BS 110 may indicate an AGC parameter based at least in part on receiving, from UE 120, an indication of received power saturation at UE 120. The indication of the received power saturation may include a saturation index and/or another type of indication of received power saturation. UE 120 may transmit the indication of the received power saturation on a PUCCH, on a PUSCH, and/or the like.

As further shown in FIG. 6B, and by reference number 606, UE 120 may perform AGC, for one or more data symbols included in the group of downlink symbols, based at least in part on the AGC parameter (e.g., the RF gain ratio) indicated in the second communication. In some aspects, UE 120 may determine, based at least in part on the RF gain ratio, an RF gain that is to be used for outer loop AGC for the one or more data symbols included in the group of downlink symbols. For example, UE 120 may use the RF gain ratio to adjust (e.g., increase or decrease) the RF gain that was used for the group of downlink symbols in which the second communication was received from BS 110, and use the adjusted RF gain as the RF gain for the one or more data symbols included in the group of downlink symbols.

Accordingly, if the receive signal strength of the one or more data symbols is too weak, UE 120 may use the RF gain parameter to boost one or more receiver gain stages, in an RF chain of UE 120, to reduce noise and improve the SNR of the transmission of the one or more data symbols. Moreover, if the receive signal strength of the transmission of the one or more data symbols is too strong, UE 120 may use the RF gain parameter to attenuate the one or more receiver gain stages in the RF chain to reduce signal clipping and/or nonlinear degradations of the transmission of the one or more data symbols.

In this way, UE 120 is capable of using the AGC parameter to perform outer loop AGC for transitions between full-duplex mode and non-full-duplex mode, which increases SNR, decreases clipping, and/or decreases nonlinear degradations for communications that are received at UE 120.

As indicated above, FIGS. 6A and 6B are provided as an example. Other examples may differ from what is described with respect to FIGS. 6A and 6B.

Figure 7A:
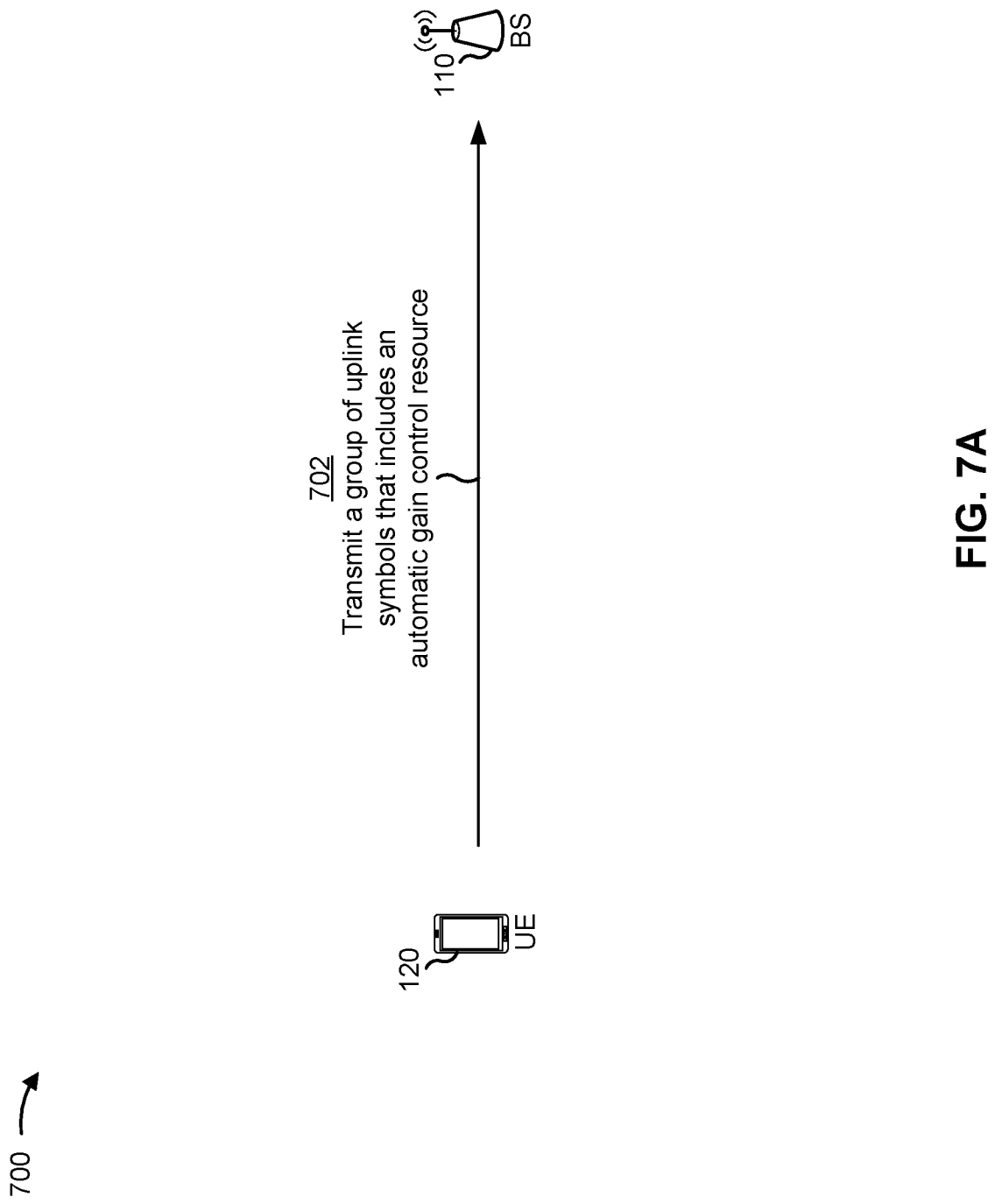

FIGS. 7A-7D are diagrams illustrating an example 700 of receiver automatic gain control, in accordance with various aspects of the present disclosure. As shown in FIG. 7A, example 700 may include a user equipment (e.g., UE 120) and a base station (e.g., BS 110). In some aspects, UE 120 and BS 110 may be communicatively connected and may communicate via a wireless communication link. The wireless communication link may include a downlink and an uplink. In some aspects, UE 120 and BS 110 may communicate using various communication modes, such as a full duplex mode, a non-full-duplex mode, and/or the like.

As shown in FIG. 7A, and by reference number 702, UE 120 may communicate with BS 110 by transmitting a group of uplink symbols to BS 110. The group of uplink symbols may be included in a full-duplex resource or a non-full-duplex resource associated with BS 110. The group of uplink symbols may include an AGC resource and one or more data symbols. The AGC resource may include a reference signal (e.g., an AGC-RS and/or another type of reference signal), a repetitive data transmission of data that is transmitted in the one or more data symbols, and/or the like.

In some aspects, BS 110 (and/or another base station) may indicate a configuration of the AGC resource to UE 120. The configuration of the AGC resource may be indicated in a signaling communication, such as an RRC communication, a MAC-CE communication, a DCI communication, and/or the like. In some aspects, the configuration of the AGC resource may indicate whether a particular group of uplink symbols includes an AGC resource and/or one or more parameters for the AGC resource in the group of uplink symbols. UE 120 may transmit the AGC resource in the group of uplink symbols based at least in part on receiving the indication of the configuration.

In some aspects, UE 120 may include the AGC resource in each group of uplink symbols transmitted from UE 120. In some aspects, UE 120 may include the AGC resource based at least in part on a transition between transition modes (e.g., a transition from a full-duplex mode to a non-full-duplex mode, a transition from a non-full-duplex mode to a full-duplex mode, and/or the like). In this case, UE 120 may include an AGC resource in a full-duplex resource that follows a non-full-duplex resource, may include an AGC resource in a non-full-duplex resource that follows a full-duplex resource, and/or the like.

The one or more parameters for the AGC resource may include a subcarrier spacing of the AGC resource (e.g., the subcarrier spacing of the AGC resource may be the same or different from the subcarrier spacing of the one or more data symbols), a transmit power of the AGC resource (e.g., the transmit power of the AGC resource may be the same or different from the transmit power of the one or more data symbols), a location of the AGC resource in the group of uplink symbols (e.g., an indication of the symbols that include the AGC resource), a length of the AGC resource (e.g., a quantity of symbols included in the AGC resource), a type of the AGC resource (e.g., whether the AGC resource includes an AGC-RS or a repetitive data transmission), a QCL of the AGC resource (e.g., an indication of whether the AGC resource is QCL'ed with the one or more data symbols), and/or the like.

Figure 7B:
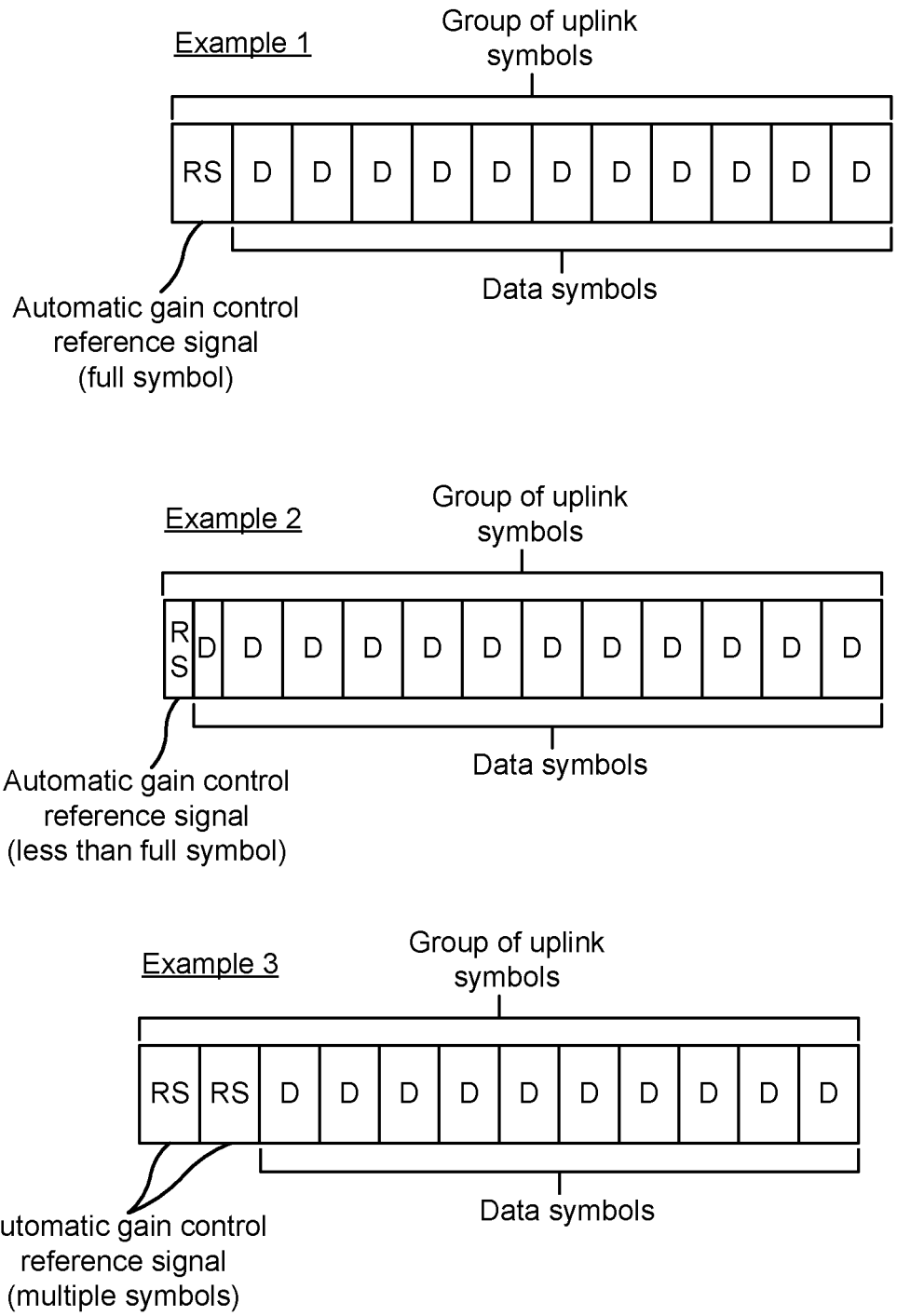

FIG. 7B illustrates various examples of AGC resource configurations where the AGC resource includes an AGC-RS. Other examples of AGC resource configurations for an AGC-RS may be used.

As shown in Example 1 illustrated in FIG. 7B, the AGC resource may include a full AGC symbol in which the AGC-RS is transmitted. The full AGC symbol may be located at the beginning of the group of uplink symbols (e.g., may be the first symbol in the group of uplink symbols), such that BS 110 may use the AGC-RS to perform AGC for the data symbols included in the group of uplink symbols, or another location in the group of uplink symbols.

As shown in Example 2 illustrated in FIG. 7B, the AGC-RS may be transmitted in less than a full AGC symbol in the group of uplink symbols. For example, the AGC-RS may be transmitted in a half AGC symbol, a quarter AGC symbol, and/or other symbol portions. The less than a full AGC symbol may be located at the beginning of the group of uplink symbols or another location in the group of uplink symbols.

As shown in Example 3 illustrated in FIG. 7B, the AGC resource may include a plurality of full AGC symbols in which the AGC-RS is transmitted. The plurality of full AGC symbols may be located at the beginning of the group of uplink symbols (e.g., may be the first symbols in the group of uplink symbols) or another location in the group of uplink symbols. The plurality of full AGC symbols may be contiguous symbols or non-contiguous symbols. Other examples of AGC resource configurations include a plurality of less than full AGC symbols in the group of uplink symbols, a combination of full AGC symbols and less than full AGC symbols in the group of uplink symbols, and/or the like.

Figure 7C:
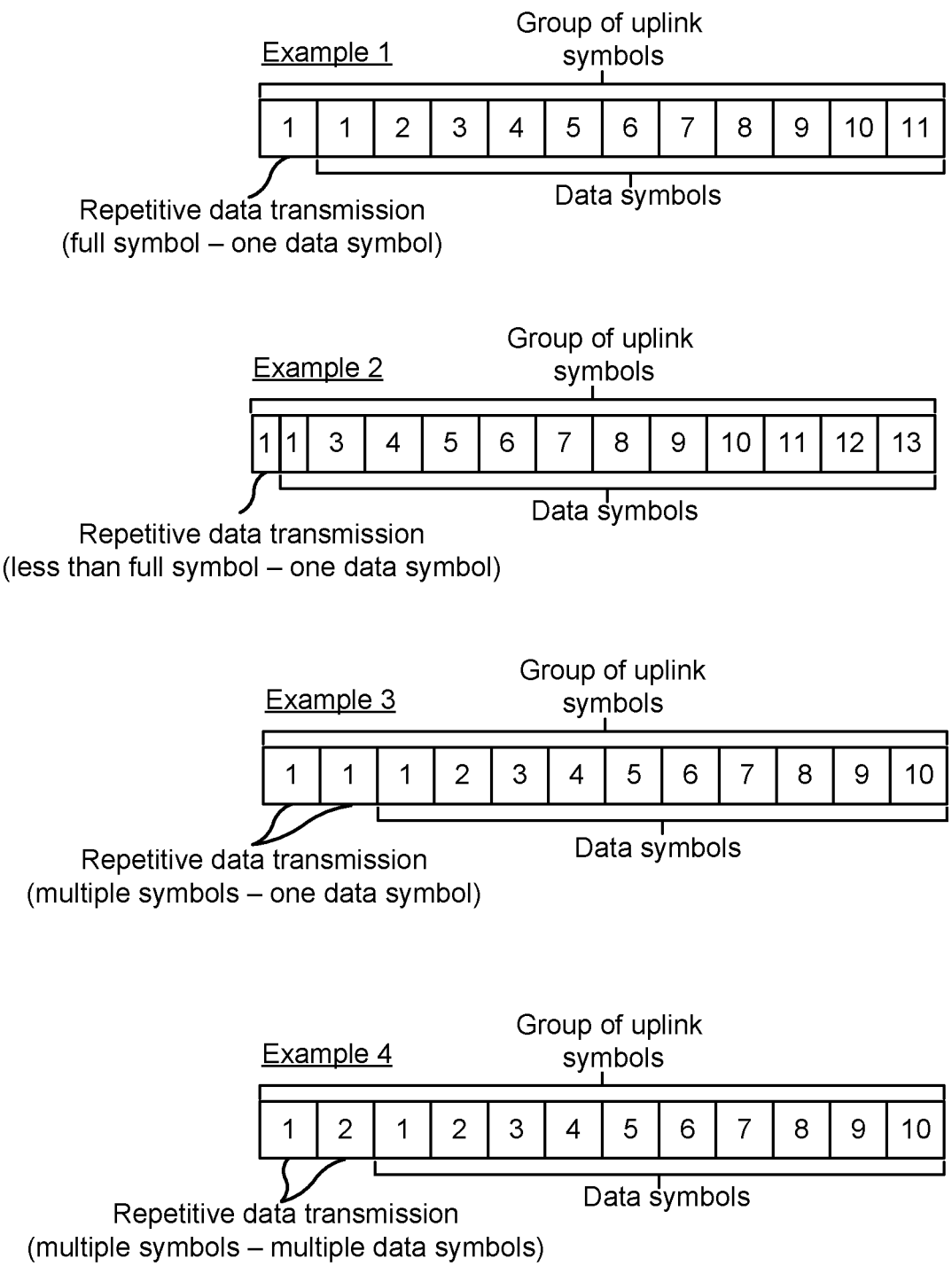

FIG. 7C illustrates various examples of AGC resource configurations where the AGC resource includes a repetitive data transmission of data that is transmitted in the one or more data symbols included in the group of uplink symbols. Other examples of AGC resource configurations for a repetitive data transmission may be used.

As shown in Example 1 illustrated in FIG. 7C, the AGC resource may include a full AGC symbol in which repetitive data for a full data symbol is transmitted. The full AGC symbol may be located at the beginning of the group of uplink symbols (e.g., may be the first symbol in the group of uplink symbols) such that BS 110 may use the repetitive data transmission to perform AGC for the data symbols included in the group of uplink symbols. The full AGC symbol may be adjacent to the data symbol associated with the repetitive data transmission. That is, the data that is to be transmitted in the full AGC symbol may be a repetition of the data that is to be transmitted in the data symbol adjacent to the full AGC symbol. For example, a repetition of the data from data symbol 1 may be transmitted in the full AGC symbol. In other examples, the data that is to be transmitted in the full AGC symbol may be a repetition of data that is to be transmitted in a data symbol that is not adjacent to the full AGC symbol.

As shown in Example 2 illustrated in FIG. 7C, the AGC resource may include a less than full AGC symbol (e.g., a half AGC symbol, a quarter AGC symbol, and/or the like) in which repetitive data for a full data symbol is transmitted. The less than full AGC symbol may be located at the beginning of the group of uplink symbols (e.g., may be the first half-symbol in the group of uplink symbols). The less than full AGC symbol may be adjacent to a full or less than full data symbol associated with the repetitive data transmission. That is, the data that is to be transmitted in the less than full AGC symbol may be a repetition of the data that is to be transmitted in the full or less than full data symbol adjacent to the less than full AGC symbol. For example, a repetition of the data from data symbol 1 (e.g., a half data symbol) may be transmitted in the less than full AGC symbol. In other examples, the data that is to be transmitted in the less than full AGC symbol may be a repetition of data that is to be transmitted in a data symbol that is not adjacent to the less than full AGC symbol.

As shown in Example 3 illustrated in FIG. 7C, the AGC resource may include a plurality of AGC symbols (e.g., full AGC symbols, less than full AGC symbols, and/or the like) in which repetitive data for a data symbol is transmitted (e.g., a full data symbol or a less than full data symbol). The plurality of AGC symbols may be located at the beginning of the group of uplink symbols (e.g., may be the first symbols in the group of uplink symbols) or another location in the group of uplink symbols. The plurality of full AGC symbols may be contiguous symbols or non-contiguous symbols. The plurality of AGC symbols may be adjacent to the data symbol associated with the repetitive data transmission. That is, the data that is to be transmitted in the plurality of AGC symbols may be a repetition of the data that is to be transmitted in the data symbol adjacent to the plurality of AGC symbols. For example, repetitions of the data from data symbol 1 may be transmitted in the plurality of AGC symbols. In other examples, the data that is to be transmitted in the plurality of AGC symbols may be a repetition of data that is to be transmitted in a data symbol that is not adjacent to the plurality of AGC symbols.

As shown in Example 4 illustrated in FIG. 7C, the AGC resource may include a plurality of AGC symbols (e.g., full AGC symbols, less than full AGC symbols, and/or the like) in which repetitive data for a plurality of data symbols is transmitted (e.g., full data symbols, less than full data symbols, and/or the like). The plurality of AGC symbols may be located at the beginning of the group of uplink symbols (e.g., may be the first symbols in the group of uplink symbols) or another location in the group of uplink symbols. The plurality of full AGC symbols may be continuous symbols or non-contiguous symbols. In some aspects, the plurality of AGC symbols may be adjacent to the plurality of data symbols associated with the repetitive data transmission. In some aspects, the plurality of AGC symbols may not be adjacent to the plurality of data symbols associated with the repetitive data transmission. In some aspects, one or more AGC symbols of the plurality of AGC symbols may be adjacent to the plurality of data symbols associated with the repetitive data transmission, and one or more other AGC symbols of the plurality of AGC symbols may not be adjacent to the plurality of data symbols associated with the repetitive data transmission. In an example, repetitions of the data from data symbol 1 and data symbol 2 may be respectively transmitted in AGC symbols of the plurality of AGC symbols.

As shown in FIG. 7D, BS 110 may perform outer loop AGC based at least in part on the AGC resource included in the group of uplink symbols. As shown by reference number 704, to perform outer loop AGC for the one or more data symbols included in the group of uplink symbols, BS 110 may determine an AGC gain parameter for the group of uplink symbols. BS 110 may determine the AGC gain parameter by performing one or more signal measurements of the AGC-RS or repetitive data transmission of the AGC resource. The one or more signal measurements may include an RSRP measurement, an RSSI measurement, an RSRQ measurement, and/or the like. BS 110 may determine the AGC parameter (e.g., an RF gain parameter and/or another type of AGC parameter), for the one or more data symbols that are included in the group of uplink symbols, based at least in part on a result of the one or more signal measurements.

As further shown in FIG. 7D, and by reference number 706, BS 110 may perform, based at least in part on the AGC parameter, AGC for the one or more data symbols included in the group of data symbols. For example, BS 110 may use the RF gain parameter and/or another type of AGC parameter to perform outer loop AGC to adjust an RF gain to increase or decrease a received signal strength of the one or more data symbols. Accordingly, if the receive signal strength of the one or more data symbols is too weak, BS 110 may use the RF gain parameter to boost one or more receiver gain stages, in an RF chain of BS 110, to reduce noise and improve the SNR of the transmission of the one or more data symbols. Moreover, if the receive signal strength of the transmission of the one or more data symbols is too strong, BS 110 may use the RF gain parameter to attenuate the one or more receiver gain stages in the RF chain to reduce signal clipping and/or nonlinear degradations of the transmission of the one or more data symbols.

In this way, BS 110 is capable of using the AGC parameter to perform outer loop AGC for transitions between full-duplex mode and non-full-duplex mode, which increases SNR, decreases clipping, and/or decreases nonlinear degradations for communications that are received at BS 110.

As indicated above, FIGS. 7A-7D are provided as an example. Other examples may differ from what is described with respect to FIGS. 7A-7D.

Figure 8:
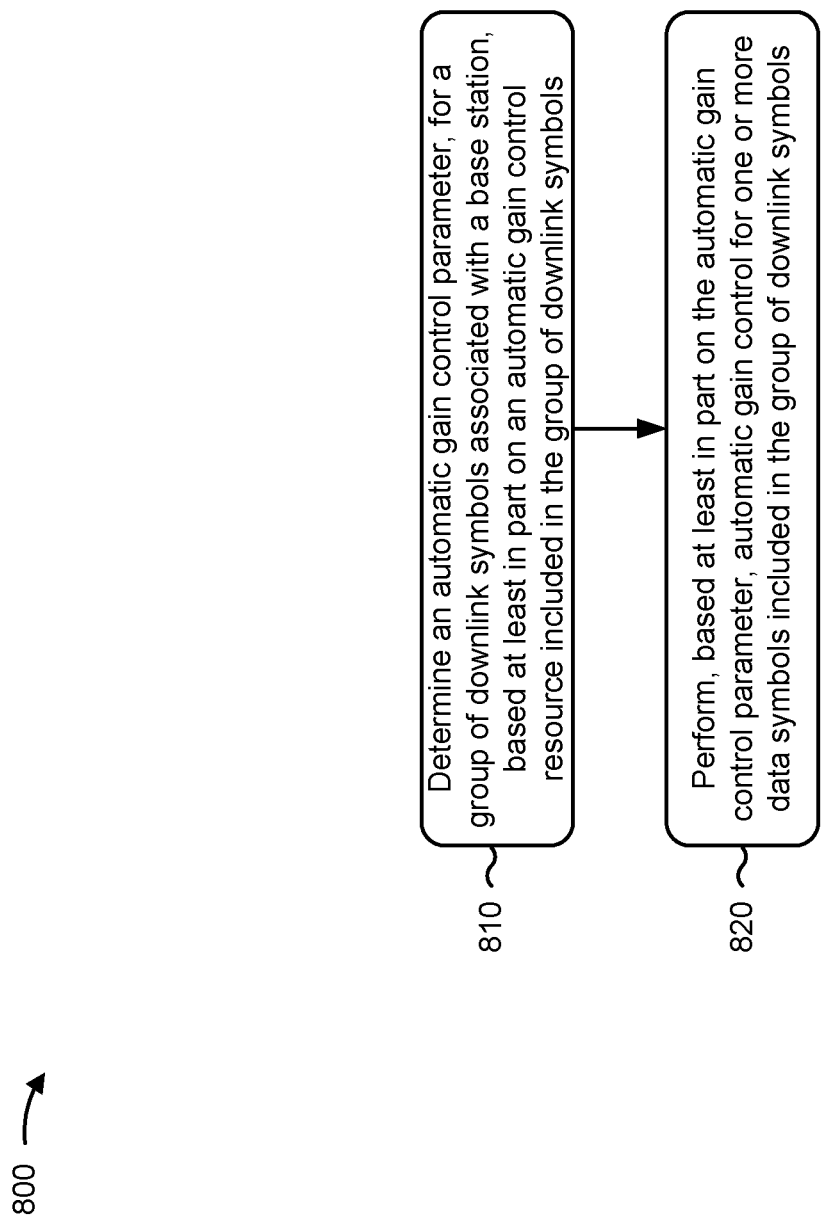
FIGS. 8 and 9 are diagrams illustrating example processes performed, for example, by a user equipment, in accordance with various aspects of the present disclosure.

FIG. 8 is a diagram illustrating an example process 800 performed, for example, by a UE, in accordance with various aspects of the present disclosure. Example process 800 is an example where a UE (e.g., UE 120) performs operations associated with receiver automatic gain control.

As shown in FIG. 8, in some aspects, process 800 may include determining an automatic gain control parameter, for a group of downlink symbols associated with a base station, based at least in part on an automatic gain control resource included in the group of downlink symbols (block 810). For example, the UE (e.g., using receive processor 258, transmit processor 264, controller/processor 280, memory 282, and/or the like) may determine an automatic gain control parameter, for a group of downlink symbols associated with a base station, based at least in part on an automatic gain control resource included in the group of downlink symbols, as described above.

As further shown in FIG. 8, in some aspects, process 800 may include performing, based at least in part on the automatic gain control parameter, automatic gain control for one or more data symbols included in the group of downlink symbols (block 820). For example, the UE (e.g., using demodulator 254, receive processor 258, transmit processor 264, controller/processor 280, memory 282, and/or the like) may perform, based at least in part on the automatic gain control parameter, automatic gain control for one or more data symbols included in the group of downlink symbols, as described above.

Process 800 may include additional aspects, such as any single implementation or any combination of aspects described below and/or in connection with one or more other processes described elsewhere herein.

In a first aspect, in connection with process 800, the automatic gain control parameter comprises a radio frequency gain parameter. In a second aspect, alone or in combination with the first aspect, and in connection with process 800, the group of downlink symbols is included in at least one of a full-duplex resource associated with the base station or a non-full-duplex resource associated with the base station. In a third aspect, alone or in combination with any one or more of the first through second aspects, and in connection with process 800, process 800 further comprises receiving a communication that indicates a configuration of the automatic gain control resource, and the communication comprises at least one of a radio resource control communication, a medium access control control element communication, or a downlink control information communication.

In a fourth aspect, alone or in combination with any one or more of the first through third aspects, and in connection with process 800, the automatic gain control resource comprises at least one of a half automatic gain control symbol included in the group of downlink symbols, a full automatic gain control symbol included in the group of downlink symbols, or a plurality of automatic gain control symbols included in the group of downlink symbols. In a fifth aspect, alone or in combination with any one or more of the first through fourth aspects, and in connection with process 800, the automatic gain control resource comprises an automatic gain control reference signal. In some aspects, determining the automatic gain control parameter comprises performing one or more signal measurements of the automatic gain control reference signal and determining the automatic gain control parameter based at least in part on the one or more signal measurements. In a sixth aspect, alone or in combination with any one or more of the first through fifth aspects, and in connection with process 800, the one or more signal measurements comprise at least one of a received signal strength indicator measurement, a reference signal received power measurement, or a reference signal received quality measurement.

In a seventh aspect, alone or in combination with any one or more of the first through sixth aspects, and in connection with process 800, the automatic gain control resource is located at a beginning of the group of downlink symbols. In an eighth aspect, alone or in combination with any one or more of the first through seventh aspects, and in connection with process 800, a configuration of the automatic gain control resource is based at least in part on at least one of a subcarrier spacing of the one or more data symbols, or a transmit power of the one or more data symbols. In a ninth aspect, alone or in combination with any one or more of the first through eighth aspects, and in connection with process 800, the automatic gain control resource is quasi-co-located with the one or more data symbols. In a tenth aspect, alone or in combination with any one or more of the first through ninth aspects, and in connection with process 800, a subcarrier spacing, of the automatic gain control resource, is different from a subcarrier spacing of the one or more data symbols.

In a eleventh aspect, alone or in combination with any one or more of the first through tenth aspects, and in connection with process 800, the automatic gain control resource comprises a repetitive data transmission associated with the one or more data symbols, and determining the automatic gain control parameter comprises performing one or more signal measurements of the repetitive data transmission and determining the automatic gain control parameter based at least in part on the one or more signal measurements. In a twelfth aspect, alone or in combination with any one or more of the first through eleventh aspects, and in connection with process 800, the one or more signal measurements comprise at least one of a received signal strength indicator measurement, a reference signal received power measurement, or a reference signal received quality measurement.

In a thirteenth aspect, alone or in combination with any one or more of the first through twelfth aspects, and in connection with process 800, the automatic gain control resource is included in a full automatic gain control symbol included in the group of downlink symbols and the repetitive data transmission is associated with a data symbol, of the one or more data symbols, adjacent to the full automatic gain control symbol. In a fourteenth aspect, alone or in combination with any one or more of the first through thirteenth aspects, and in connection with process 800, the automatic gain control resource is included in a plurality of contiguous full automatic gain control symbols included in the group of downlink symbols and the repetitive data transmission is associated with a data symbol, of the one or more data symbols, adjacent to the plurality of contiguous full automatic gain control symbols.

In a fifteenth aspect, alone or in combination with any one or more of the first through fourteenth aspects, and in connection with process 800, the automatic gain control resource is included in a plurality of contiguous full automatic gain control symbols included in the group of downlink symbols and the repetitive data transmission is associated with a plurality of contiguous data symbols, of the one or more data symbols, adjacent to the plurality of contiguous full automatic gain control symbols. In some aspects, respective full automatic gain control symbols, of the plurality of contiguous full automatic gain control symbols, include respective repetitive data transmissions of the plurality of contiguous data symbols.

In a sixteenth aspect, alone or in combination with any one or more of the first through fifteenth aspects, and in connection with process 800, the automatic gain control resource includes a half automatic gain control symbol included in the group of downlink symbols and the repetitive data transmission is associated with a half data symbol, of the one or more data symbols, adjacent to the half automatic gain control symbol. In a seventeenth aspect, alone or in combination with any one or more of the first through sixteenth aspects, and in connection with process 800, process 800 further comprises detecting received power saturation at the user equipment, transmitting, to the base station and based at least in part on detecting the received power saturation, a saturation index to indicate, to the base station, the received power saturation, and receiving, from the base station and based at least in part on transmitting the saturation index to the base station, an indication that the group of downlink symbols includes the automatic gain control resource. In an eighteenth aspect, alone or in combination with any one or more of the first through seventeenth aspects, and in connection with process 800, transmitting the saturation index comprises transmitting the saturation index on a physical uplink control channel, or transmitting the saturation index on a physical uplink shared channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
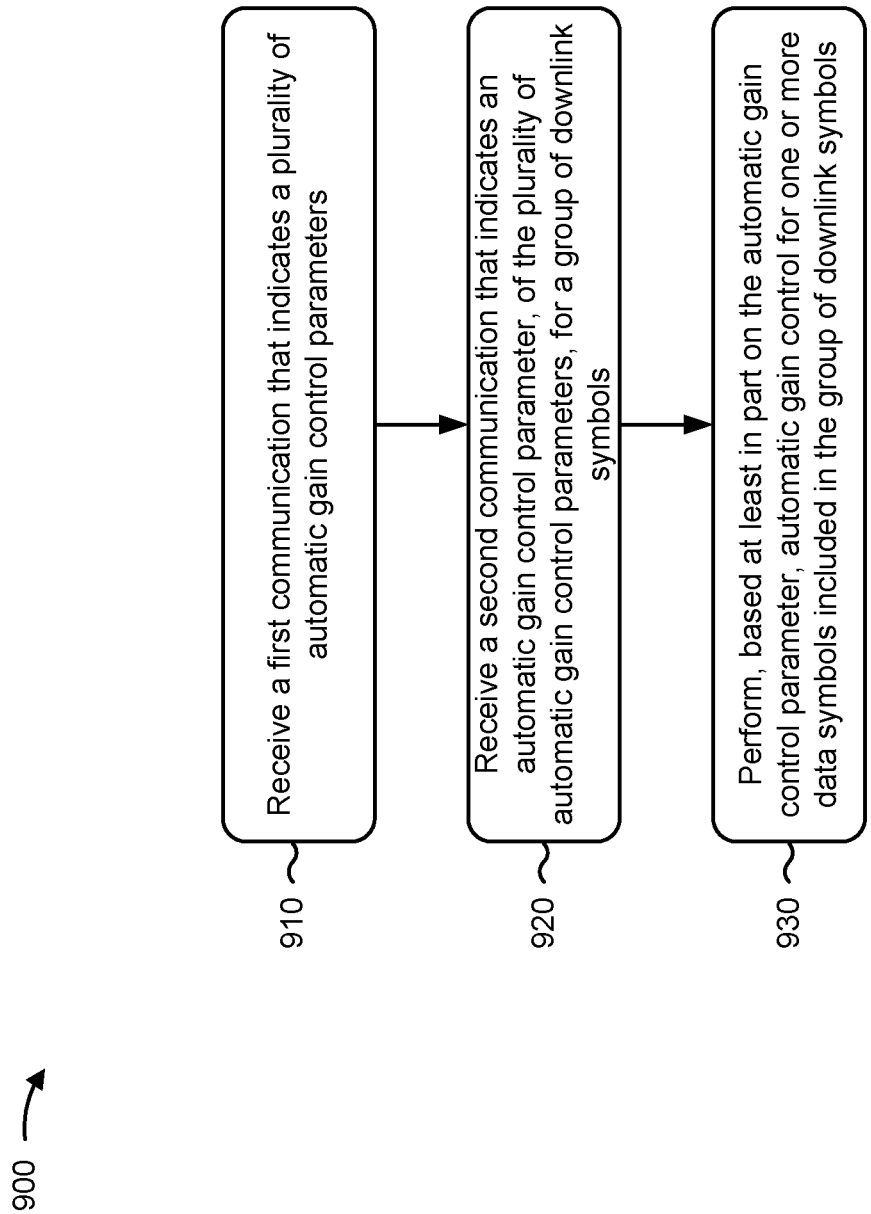

FIG. 9 is a diagram illustrating an example process 900 performed, for example, by a UE, in accordance with various aspects of the present disclosure. Example process 900 is an example where a UE (e.g., UE 120) performs operations associated with receiver automatic gain control.

As shown in FIG. 9, in some aspects, process 900 may include receiving a first communication that indicates a plurality of automatic gain control parameters (block 910). For example, the UE (e.g., using receive processor 258, transmit processor 264, controller/processor 280, memory 282, and/or the like) may receive a first communication that indicates a plurality of automatic gain control parameters, as described above.

As further shown in FIG. 9, in some aspects, process 900 may include receiving a second communication that indicates an automatic gain control parameter, of the plurality of automatic gain control parameters, for a group of downlink symbols (block 920). For example, the UE (e.g., using receive processor 258, transmit processor 264, controller/processor 280, memory 282, and/or the like) may receive a second communication that indicates an automatic gain control parameter, of the plurality of automatic gain control parameters, for a group of downlink symbols, as described above.

As further shown in FIG. 9, in some aspects, process 900 may include performing, based at least in part on the automatic gain control parameter, automatic gain control for one or more data symbols included in the group of downlink symbols (block 930). For example, the UE (e.g., using demodulator 254, receive processor 258, transmit processor 264, controller/processor 280, memory 282, and/or the like) may perform, based at least in part on the automatic gain control parameter, automatic gain control for one or more data symbols included in the group of downlink symbols, as described above.

Process 900 may include additional aspects, such as any single implementation or any combination of aspects described below and/or in connection with one or more other processes described elsewhere herein.

In a first aspect, and in connection with process 900, the plurality of automatic gain control parameters comprises a plurality of downlink power ratios between a full-duplex resource associated with a base station and a non-full-duplex resource associated with the base station. In a second aspect, alone or in combination with the first aspect, and in connection with process 900, the first communication comprises a master information block, a system information block, a remaining minimum system information communication, or an other system information communication. In a third aspect, alone or in combination with any one or more of the first through second aspects, and in connection with process 900, the second communication comprises a radio resource control communication, a medium access control control element communication, or a downlink control information communication. In a fourth aspect, alone or in combination with any one or more of the first through third aspects, and in connection with process 900, receiving the second communication comprises receiving the second communication in a downlink symbol that is included in another group of downlink symbols.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
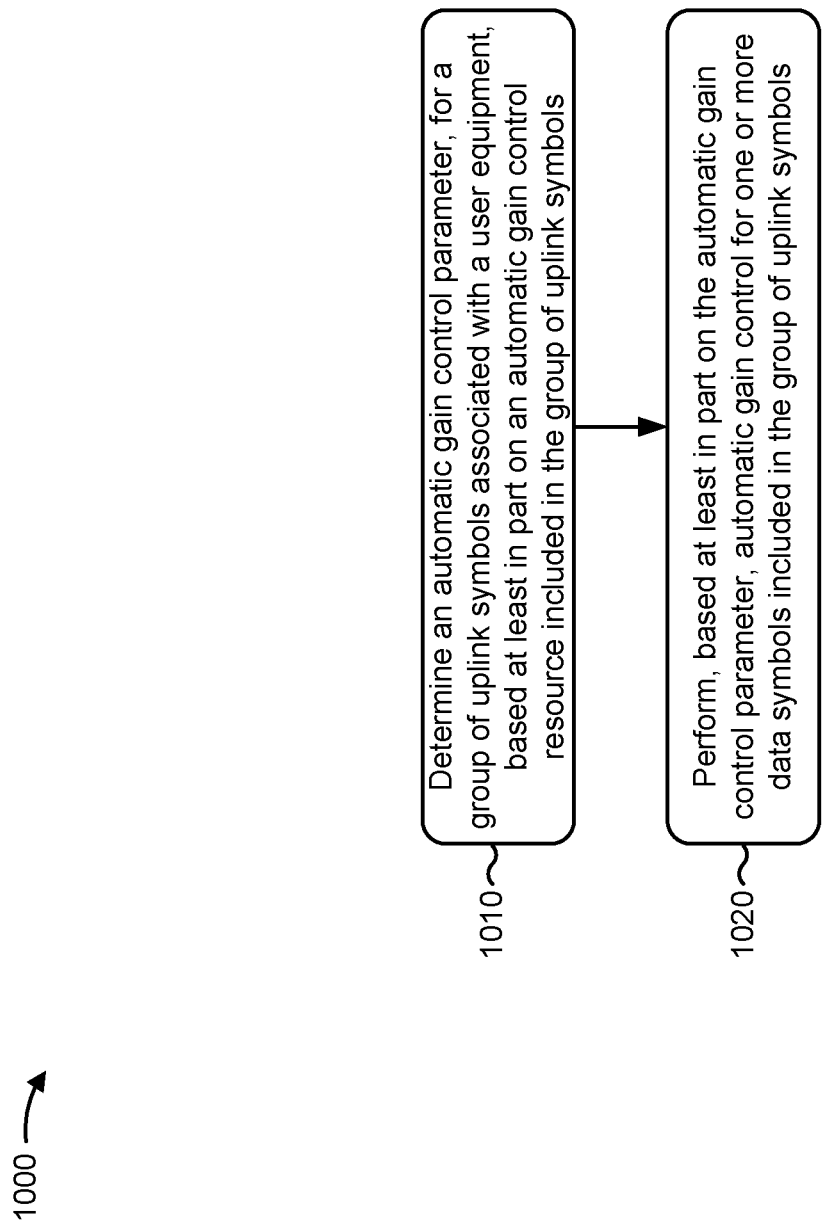
FIGS. 10 and 11 are diagrams illustrating example processes performed, for example, by a base station, in accordance with various aspects of the present disclosure.

FIG. 10 is a diagram illustrating an example process 1000 performed, for example, by a BS, in accordance with various aspects of the present disclosure. Example process 1000 is an example where a BS (e.g., BS 110) performs operations associated with receiver automatic gain control.

As shown in FIG. 10, in some aspects, process 1000 may include determining an automatic gain control parameter, for a group of uplink symbols associated with a user equipment, based at least in part on an automatic gain control resource included in the group of uplink symbols (block 1010). For example, the BS (e.g., using transmit processor 220, receive processor 238, controller/processor 240, memory 242, and/or the like) may determine an automatic gain control parameter, for a group of uplink symbols associated with a user equipment, based at least in part on an automatic gain control resource included in the group of uplink symbols, as described above.

As further shown in FIG. 10, in some aspects, process 1000 may include performing, based at least in part on the automatic gain control parameter, automatic gain control for one or more data symbols included in the group of uplink symbols (block 1020). For example, the BS (e.g., using transmit processor 220, demodulator 232, receive processor 238, controller/processor 240, memory 242, and/or the like) may perform, based at least in part on the automatic gain control parameter, automatic gain control for one or more data symbols included in the group of uplink symbols, as described above.

Process 1000 may include additional aspects, such as any single implementation or any combination of aspects described below and/or in connection with one or more other processes described elsewhere herein.

In a first aspect, and in connection with process 1000, the automatic gain control parameter comprises a radio frequency gain parameter. In a second aspect, alone or in combination with the first aspect, and in connection with process 1000, the group of uplink symbols is included in at least one of a full-duplex resource associated with the base station or a non-full-duplex resource associated with the base station. In a second aspect, alone or in combination with the first aspect, and in connection with process 1000, process 1000 further comprises transmitting a communication that indicates a configuration of the automatic gain control resource, the communication comprising at least one of a radio resource control communication, a medium access control control element communication, or a downlink control information communication.

In a third aspect, alone or in combination with any one or more of the first through second aspects, and in connection with process 1000, the automatic gain control resource comprises at least one of a half automatic gain control symbol included in the group of uplink symbols a full automatic gain control symbol included in the group of uplink symbols, or a plurality of automatic gain control symbols included in the group of uplink symbols. In a fourth aspect, alone or in combination with any one or more of the first through third aspects, and in connection with process 1000, the automatic gain control resource comprises an automatic gain control reference signal, and determining the automatic gain control parameter comprises determining the automatic gain control parameter based at least in part on the one or more signal measurements.

In a fifth aspect, alone or in combination with any one or more of the first through fourth aspects, and in connection with process 1000, the one or more signal measurements comprise at least one of a received signal strength indicator measurement, a reference signal received power measurement, or a reference signal received quality measurement. In a sixth aspect, alone or in combination with any one or more of the first through fifth aspects, and in connection with process 1000, the automatic gain control resource is located at a beginning of the group of uplink symbols. In a seventh aspect, alone or in combination with any one or more of the first through sixth aspects, and in connection with process 1000, a configuration of the automatic gain control resource is based at least in part on at least one of a subcarrier spacing of the one or more data symbols or a transmit power of the one or more data symbols. In an eighth aspect, alone or in combination with any one or more of the first through seventh aspects, and in connection with process 1000, the automatic gain control resource is quasi-co-located with the one or more data symbols.

In a ninth aspect, alone or in combination with any one or more of the first through eighth aspects, and in connection with process 1000, a subcarrier spacing, of the automatic gain control resource, is different from a subcarrier spacing of the one or more data symbols. In a tenth aspect, alone or in combination with any one or more of the first through ninth aspects, and in connection with process 1000, the automatic gain control resource comprises a repetitive data transmission associated with the one or more data symbols. In some aspects, determining the automatic gain control parameter comprises performing one or more signal measurements of the automatic gain control reference signal and determining the automatic gain control parameter based at least in part on the one or more signal measurements. In an eleventh aspect, alone or in combination with any one or more of the first through tenth aspects, and in connection with process 1000, the one or more signal measurements comprise at least one of a received signal strength indicator measurement, a reference signal received power measurement, or a reference signal received quality measurement.

In a twelfth aspect, alone or in combination with any one or more of the first through eleventh aspects, and in connection with process 1000, the automatic gain control resource is included in a full automatic gain control symbol included in the group of uplink symbols and the repetitive data transmission is associated with a data symbol, of the one or more data symbols, adjacent to the full automatic gain control symbol. In a thirteenth aspect, alone or in combination with any one or more of the first through twelfth aspects, and in connection with process 1000, the automatic gain control resource is included in a plurality of contiguous full automatic gain control symbols included in the group of uplink symbols and the repetitive data transmission is associated with a data symbol, of the one or more data symbols, adjacent to the plurality of contiguous full automatic gain control symbols.

In a fourteenth aspect, alone or in combination with any one or more of the first through thirteenth aspects, and in connection with process 1000, the automatic gain control resource is included in a plurality of contiguous full automatic gain control symbols included in the group of uplink symbols and the repetitive data transmission is associated with a plurality of contiguous data symbols, of the one or more data symbols, adjacent to the plurality of contiguous full automatic gain control symbols. In some aspects, respective full automatic gain control symbols, of the plurality of contiguous full automatic gain control symbols include respective repetitive data transmissions of the plurality of contiguous data symbols.

In a fifteenth aspect, alone or in combination with any one or more of the first through fourteenth aspects, and in connection with process 1000, the automatic gain control resource includes a half automatic gain control symbol included in the group of uplink symbols and the repetitive data transmission is associated with a half data symbol, of the one or more data symbols, adjacent to the half automatic gain control symbol.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
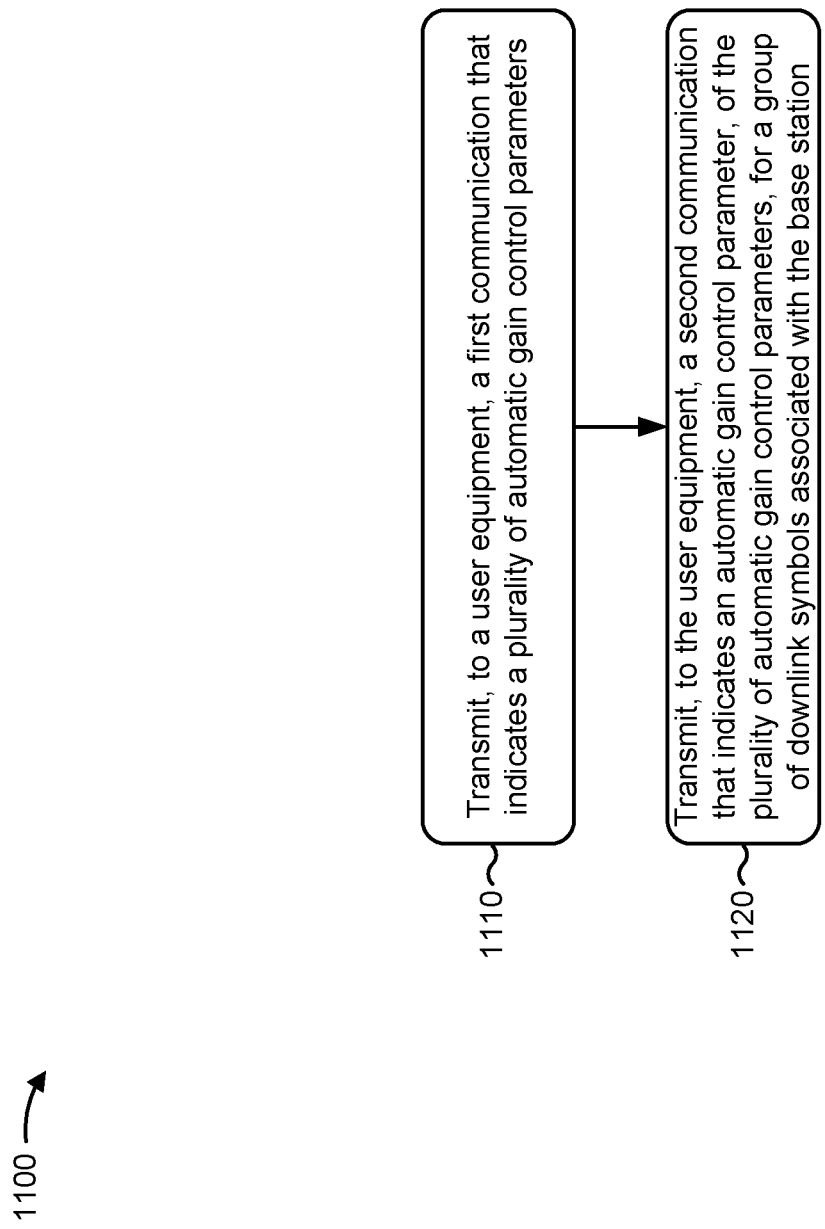

FIG. 11 is a diagram illustrating an example process 1100 performed, for example, by a BS, in accordance with various aspects of the present disclosure. Example process 1100 is an example where a BS (e.g., BS 110) performs operations associated with receiver automatic gain control.

As shown in FIG. 11, in some aspects, process 1100 may include transmitting, to a user equipment, a first communication that indicates a plurality of automatic gain control parameters (block 1110). For example, the BS (e.g., using transmit processor 220, receive processor 238, controller/processor 240, memory 242, and/or the like) may transmit, to a user equipment, a first communication that indicates a plurality of automatic gain control parameters, as described above.

As further shown in FIG. 11, in some aspects, process 1100 may include transmitting, to the user equipment, a second communication that indicates an automatic gain control parameter, of the plurality of automatic gain control parameters, for a group of downlink symbols associated with the base station (block 1120). For example, the BS (e.g., using transmit processor 220, receive processor 238, controller/processor 240, memory 242, and/or the like) may transmit, to the user equipment, a second communication that indicates an automatic gain control parameter, of the plurality of automatic gain control parameters, for a group of downlink symbols associated with the base station, as described above.

Process 1100 may include additional aspects, such as any single implementation or any combination of aspects described below and/or in connection with one or more other processes described elsewhere herein.

In a first aspect, and in connection with process 1100, the plurality of automatic gain control parameters comprises a plurality of downlink power ratios between a full-duplex resource associated with a base station and a non-full-duplex resource associated with the base station. In a second aspect, alone or in combination with the first aspect, and in connection with process 1100, the first communication comprises a master information block, a system information block, a remaining minimum system information communication, or an other system information communication. In a third aspect, alone or in combination with any one or more of the first through second aspects, and in connection with process 1100, the second communication comprises a radio resource control communication, a medium access control control element communication, or a downlink control information communication.

In a fourth aspect, alone or in combination with any one or more of the first through third aspects, and in connection with process 1100, transmitting the second communication comprises transmitting the second communication in a downlink symbol that is included in another group of downlink symbols. In a fifth aspect, alone or in combination with any one or more of the first through fourth aspects, and in connection with process 1100, transmitting the second communication comprises transmitting the second communication based at least in part on receiving, from the user equipment, an indication of received power saturation at the user equipment. In a sixth aspect, alone or in combination with any one or more of the first through fifth aspects, and in connection with process 1100, the indication of the received power saturation at the user equipment comprises a saturation index included in an uplink communication. In a seventh aspect, alone or in combination with any one or more of the first through sixth aspects, and in connection with process 1100, the uplink communication comprises a physical uplink control channel communication, or a physical uplink shared channel communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items reference in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment for wireless communication, comprising:
one or more memories; and
one or more processors coupled to the one or more memories, the one or more memories and the one or more processors configured to:
determine an automatic gain control parameter, for a group of downlink symbols associated with a base station, based at least in part on an automatic gain control resource included in the group of downlink symbols,
wherein the automatic gain control resource comprises a plurality of contiguous automatic gain control symbols included in the group of downlink symbols,
wherein the group of downlink symbols further includes one or more data symbols,
wherein a first automatic gain control symbol of the plurality of contiguous automatic gain control symbols comprises a first repetitive data transmission, and the first repetitive data transmission includes a repetition of data that is also included in at least one of the one or more data symbols,
wherein a second automatic gain control symbol of the plurality of contiguous automatic gain control symbols comprises a second repetitive data transmission, and the second repetitive data transmission includes another repetition of data that is also included in at least one of the one or more data symbols, and
wherein the automatic gain control resource is included in one of:
a full-duplex resource that follows a non-full-duplex resource, or
a non-full-duplex resource that follows a full-duplex resource; and
perform, based at least in part on the automatic gain control parameter, automatic gain control for the one or more data symbols.

2. The user equipment of claim 1, wherein the automatic gain control parameter comprises:
a radio frequency gain parameter.

3. The user equipment of claim 1, wherein the group of downlink symbols is included in at least one of:
a full-duplex resource associated with the base station, or
a non-full-duplex resource associated with the base station.

4. The user equipment of claim 1, wherein the automatic gain control resource comprises:
an automatic gain control reference signal; and
wherein the one or more processors, when determining the automatic gain control parameter, are configured to:
perform one or more signal measurements of the automatic gain control reference signal; and
determine the automatic gain control parameter based at least in part on the one or more signal measurements.

5. The user equipment of claim 1, wherein at least one of:
the automatic gain control resource is located at a beginning of the group of downlink symbols,
the automatic gain control resource is quasi-co-located with the one or more data symbols, or
a subcarrier spacing, of the automatic gain control resource, is different from a subcarrier spacing of the one or more data symbols.

6. The user equipment of claim 1, wherein a configuration of the automatic gain control resource is based at least in part on at least one of:
a subcarrier spacing of the one or more data symbols, or
a transmit power of the one or more data symbols.

7. The user equipment of claim 1,
wherein the one or more processors, when determining the automatic gain control parameter, are configured to:
perform one or more signal measurements of at least one of the first repetitive data transmission or the second repetitive data transmission; and
determine the automatic gain control parameter based at least in part on the one or more signal measurements.

8. The user equipment of claim 7, wherein the first automatic gain control symbol and the second automatic gain control symbol form a plurality of contiguous full automatic gain control symbols included in the group of downlink symbols; and
wherein the first repetitive data transmission is associated with a data symbol, of the one or more data symbols, adjacent to the plurality of contiguous full automatic gain control symbols.

9. The user equipment of claim 7, wherein the first automatic gain control symbol and the second automatic gain control symbol form a plurality of contiguous full automatic gain control symbols included in the group of downlink symbols;
wherein the first repetitive data transmission is associated with a plurality of contiguous data symbols, of the one or more data symbols, adjacent to the plurality of contiguous full automatic gain control symbols; and
wherein respective full automatic gain control symbols, of the plurality of contiguous full automatic gain control symbols, include respective repetitive data transmissions of the plurality of contiguous data symbols.

10. The user equipment of claim 7, wherein the automatic gain control resource includes a half automatic gain control symbol included in the group of downlink symbols; and
wherein the first repetitive data transmission is associated with a half data symbol, of the one or more data symbols, adjacent to the half automatic gain control symbol.

11. The user equipment of claim 1, wherein the one or more processors are further configured to:
detect received power saturation at the user equipment;
transmit, to the base station and based at least in part on detecting the received power saturation, a saturation index to indicate, to the base station, the received power saturation; and
receive, from the base station and based at least in part on transmitting the saturation index to the base station, an indication that the group of downlink symbols includes the automatic gain control resource.

12. The UE of claim 1, wherein the one or more data symbols include a group of contiguous data symbols that is adjacent to the plurality of contiguous automatic gain control symbols.

13. The user equipment of claim 1, wherein the repetition of data included in the first repetitive data transmission is different from the repetition of data included in the second repetitive data transmission.

14. A user equipment (UE) for wireless communication, comprising:
one or more memories; and
one or more processors coupled to the one or more memories, the one or more memories and the one or more processors configured to:
receive a first communication that indicates a plurality of automatic gain control parameters, wherein the plurality of automatic gain control parameters comprises:

a plurality of downlink power ratios between a full-duplex resource associated with a base station and a non-full-duplex resource associated with the base station;
receive a second communication that indicates an automatic gain control parameter, of the plurality of automatic gain control parameters, for a group of downlink symbols,
wherein the second communication comprises one or more automatic gain control symbols included in the group of downlink symbols,
wherein the group of downlink symbols further includes one or more data symbols,
wherein a first automatic gain control symbol of the one or more automatic gain control symbols comprise a first repetitive data transmission, and the first repetitive data transmission includes a repetition of data that is also included in at least one of the one or more data symbols,
wherein a second automatic gain control symbol of the automatic gain control symbols comprises a second repetitive data transmission, and the second repetitive data transmission includes another repetition of data that is also included in at least one of the one or more data symbols, and
wherein the automatic gain control symbols are included in one of:
a full-duplex resource that follows a non-full-duplex resource, or
a non-full-duplex resource that follows a full-duplex resource; and
perform, based at least in part on the automatic gain control parameter, automatic gain control for the one or more data symbols.

15. The UE of claim 14, wherein the one or more data symbols include a group of contiguous data symbols that is adjacent to a symbol that includes the automatic gain control parameter.

16. The user equipment of claim 14, wherein the repetition of data included in the first repetitive data transmission is different from the repetition of data included in the second repetitive data transmission.

17. A base station for wireless communication, comprising:
one or more memories; and
one or more processors coupled to the one or more memories, the one or more memories and the one or more processors configured to:
determine an automatic gain control parameter, for a group of uplink symbols associated with a user equipment, based at least in part on an automatic gain control resource included in the group of uplink symbols,
wherein the automatic gain control resource comprises a plurality of contiguous automatic gain control symbols included in the group of downlink symbols,
wherein the group of uplink symbols further includes one or more data symbols,
wherein a first automatic gain control symbol of the plurality of contiguous automatic gain control symbols comprises a first repetitive data transmission, and the first repetitive data transmission includes a repetition of data that is also included in at least one of the one or more data symbols,
wherein a second automatic gain control symbol of the plurality of contiguous automatic gain control symbols comprises a second repetitive data transmission, and the second repetitive data transmission includes another repetition of data that is also included in at least one of the one or more data symbols, and
wherein the automatic gain control resource is included in one of:
a full-duplex resource that follows a non-full-duplex resource, or
a non-full-duplex resource that follows a full-duplex resource; and
perform, based at least in part on the automatic gain control parameter, automatic gain control for the one or more data symbols.

18. The base station of claim 17, wherein the automatic gain control parameter comprises:
a radio frequency gain parameter.

19. The base station of claim 17, wherein the automatic gain control resource comprises:
an automatic gain control reference signal; and
wherein the one or more processors, when determining the automatic gain control parameter, are configured to:
perform one or more signal measurements of the automatic gain control reference signal; and
determine the automatic gain control parameter based at least in part on the one or more signal measurements.

20. The base station of claim 17, wherein at least one of:
the automatic gain control resource is located at a beginning of the group of uplink symbols,
the automatic gain control resource is quasi-co-located with the one or more data symbols, or
a subcarrier spacing, of the automatic gain control resource, is different from a subcarrier spacing of the one or more data symbols.

21. The base station of claim 17, wherein a configuration of the automatic gain control resource is based at least in part on at least one of:
a subcarrier spacing of the one or more data symbols, or
a transmit power of the one or more data symbols.

22. The base station of claim 17,
wherein the one or more processors, when determining the automatic gain control parameter, are configured to:
perform one or more signal measurements of at least one of the first repetitive data transmission or the second repetitive data transmission; and
determine the automatic gain control parameter based at least in part on the one or more signal measurements.

23. The base station of claim 22, wherein the first automatic gain control symbol and the second automatic gain control symbol comprise a plurality of contiguous full automatic gain control symbols included in the group of uplink symbols; and
wherein the first repetitive data transmission is associated with a data symbol, of the one or more data symbols, adjacent to the plurality of contiguous full automatic gain control symbols.

24. The base station of claim 22, wherein the first automatic gain control symbol and the second automatic gain control symbol comprise a plurality of contiguous full automatic gain control symbols included in the group of uplink symbols;
wherein the first repetitive data transmission is associated with a plurality of contiguous data symbols, of the one or more data symbols, adjacent to the plurality of contiguous full automatic gain control symbols; and wherein respective full automatic gain control symbols, of the plurality of contiguous full automatic gain control symbols, include respective repetitive data transmissions of the plurality of contiguous data symbols.

25. The base station of claim 22, wherein the automatic gain control resource includes a half automatic gain control symbol included in the group of uplink symbols; and
wherein the first repetitive data transmission is associated with a half data symbol, of the one or more data symbols, adjacent to the half automatic gain control symbol.

26. The base station of claim 17, wherein the one or more data symbols include a group of contiguous data symbols that is adjacent to the plurality of contiguous automatic gain control symbols.

27. The base station of claim 17, wherein the repetition of data included in the first repetitive data transmission is different from the repetition of data included in the second repetitive data transmission.

28. A base station for wireless communication, comprising:
one or more memories; and
one or more processors coupled to the one or more memories, the one or more memories and the one or more processors configured to:
transmit, to a user equipment, a first communication that indicates a plurality of automatic gain control parameters, wherein the plurality of automatic gain control parameters comprises:
a plurality of downlink power ratios between a full-duplex resource associated with the base station and a non-full-duplex resource associated with the base station; and
transmit, to the user equipment, a second communication that indicates an automatic gain control parameter, of the plurality of automatic gain control parameters, for a group of downlink symbols associated with the base station,
wherein the second communication comprises one or more automatic gain control symbols included in the group of downlink symbols,
wherein the group of downlink symbols further includes one or more data symbols,
wherein a first automatic gain control symbol of the one or more automatic gain control symbols comprise a first repetitive data transmission, and the first repetitive data transmission includes a repetition of data that is also included in at least one of the one or more data symbols,
wherein a second automatic gain control symbol of the one or more automatic gain control symbols comprises a second repetitive data transmission, and the second repetitive data transmission includes another repetition of data that is also included in at least one of the one or more data symbols, and
wherein the one or more automatic gain control symbols are included in one of:
a full-duplex resource that follows a non-full-duplex resource, or
a non-full-duplex resource that follows a full-duplex resource.

29. The base station of claim 28, wherein the one or more processors, when transmitting the second communication, are configured to:
transmit the second communication based at least in part on receiving, from the user equipment, an indication of received power saturation at the user equipment,
wherein the indication of the received power saturation at the user equipment includes a saturation index included in an uplink communication.

30. The base station of claim 28, wherein the group of downlink symbols, for which the automatic gain control parameter is indicated, is a group of contiguous downlink symbols that is adjacent to a symbol that includes the automatic gain control parameter.

* * * * *